(12) United States Patent
Zhang et al.

(10) Patent No.: US 12,549,108 B2
(45) Date of Patent: Feb. 10, 2026

(54) WIDE RANGE OUTPUT VOLTAGE CONTROL METHOD FOR DUAL ACTIVE BRIDGE TOPOLOGY WITH HIGH EFFICIENCY

(71) Applicant: Infineon Technologies Austria AG, Villach (AT)

(72) Inventors: Yi Zhang, Shenzhen (CN); Cheng Zhang, Shenzhen (CN); Sanbao Shi, Shenzhen (CN)

(73) Assignee: Infineon Technologies Austria AG, Villach (AT)

( * ) Notice: Subject to any disclaimer, the term of this patent is extended or adjusted under 35 U.S.C. 154(b) by 197 days.

(21) Appl. No.: 18/435,527

(22) Filed: Feb. 7, 2024

(65) Prior Publication Data

US 2025/0253775 A1 Aug. 7, 2025

(51) Int. Cl.
*H02M 3/335* (2006.01)
*H02M 1/00* (2006.01)
*H02M 3/00* (2006.01)

(52) U.S. Cl.
CPC ..... *H02M 3/33576* (2013.01); *H02M 1/0003* (2021.05); *H02M 3/33571* (2021.05); *H02M 3/33573* (2021.05); *H02M 3/33584* (2013.01); *H02M 3/01* (2021.05)

(58) Field of Classification Search
CPC .......... H02M 3/33576; H02M 1/0003; H02M 3/33571; H02M 3/33573; H02M 3/33584; H02M 3/01
See application file for complete search history.

(56) References Cited

U.S. PATENT DOCUMENTS

| | | | | |
|---|---|---|---|---|
| 10,749,441 | B1* | 8/2020 | Singh | H02M 3/33584 |
| 10,804,808 | B1* | 10/2020 | Fu | H02M 3/33584 |
| 11,677,326 | B2* | 6/2023 | Yang | H02M 1/0032 |
| | | | | 363/17 |
| 11,870,342 | B2* | 1/2024 | Huang | H02M 3/33571 |
| 2010/0134053 | A1* | 6/2010 | Yamada | H02P 27/08 |
| | | | | 318/162 |
| 2011/0249472 | A1* | 10/2011 | Jain | H02M 3/33584 |
| | | | | 363/15 |
| 2012/0294045 | A1* | 11/2012 | Fornage | H02M 7/217 |
| | | | | 363/17 |
| 2013/0293192 | A1* | 11/2013 | Abe | H02J 50/12 |
| | | | | 320/108 |

(Continued)

*Primary Examiner* — Yusef A Ahmed
(74) *Attorney, Agent, or Firm* — Harrity & Harrity, LLP

(57) ABSTRACT

A system for controlling a dual active bridge converter includes a regulator circuit configured to determine a control variable based on at least one of an output voltage or an output current of the dual active bridge converter; and a pulse-width modulation (PWM) generator including a plurality of outputs coupled to a plurality of switches of the dual active bridge converter. The PWM generator is configured to drive a first half-bridge based on a first duty cycle, and drive a second half-bridge based on a second duty cycle. The regulator circuit is configured to multiply the control variable by a scaling factor to determine the first duty cycle and the second duty cycle. The PWM generator is configured to generate a plurality of control signals based on the control variable, the first duty cycle, and the second duty cycle for driving the plurality of switches.

18 Claims, 6 Drawing Sheets

(56) References Cited

U.S. PATENT DOCUMENTS

| | | | | |
|---|---|---|---|---|
| 2014/0160800 A1* | 6/2014 | Zimmanck | ............ | H02M 5/293 |
| | | | | 363/17 |
| 2014/0183953 A1* | 7/2014 | Harrison | ............. | H02M 7/4807 |
| | | | | 307/52 |
| 2014/0268897 A1* | 9/2014 | Zimmanck | .......... | H02M 3/3353 |
| | | | | 363/17 |
| 2014/0347767 A1* | 11/2014 | Nakamura | ........... | H02H 7/1213 |
| | | | | 361/18 |
| 2015/0049518 A1* | 2/2015 | Harrison | ............. | H02M 7/4807 |
| | | | | 363/17 |
| 2016/0020702 A1* | 1/2016 | Trescases | .......... | H02M 3/33592 |
| | | | | 363/17 |
| 2017/0310229 A1* | 10/2017 | Fujisaki | ............ | H02M 3/33507 |
| 2017/0370977 A1* | 12/2017 | El-Barbari | ............. | G01R 15/18 |
| 2019/0028035 A1* | 1/2019 | Choi | ....................... | H02M 3/01 |
| 2020/0144926 A1* | 5/2020 | Murakami | ........ | H02M 3/33573 |
| 2020/0324665 A1* | 10/2020 | Mackenzie | ............. | B60L 53/22 |
| 2021/0155100 A1* | 5/2021 | Khaligh | .................. | B60L 55/00 |
| 2021/0384840 A1* | 12/2021 | Kumar | ............. | H02M 3/33592 |
| 2021/0408913 A1* | 12/2021 | Yanagida | ............ | H02M 1/0025 |
| 2022/0103082 A1* | 3/2022 | Yang | ................. | H02M 3/33592 |
| 2022/0173669 A1* | 6/2022 | Chen | ................ | H02M 3/33573 |
| 2022/0278625 A1* | 9/2022 | Hirota | ................ | H02M 1/0058 |
| 2022/0337166 A1* | 10/2022 | Chan | .................... | H02M 1/007 |
| 2022/0416677 A1* | 12/2022 | Yang | ................. | H02M 3/33573 |
| 2023/0037590 A1* | 2/2023 | Jang | .................... | H02M 1/15 |
| 2023/0066489 A1* | 3/2023 | Zou | ........................ | H02J 7/007 |
| 2023/0155514 A1* | 5/2023 | Saha | ................... | H02M 1/0058 |
| | | | | 363/17 |
| 2024/0154534 A1* | 5/2024 | Shi | .................... | H02M 3/33573 |
| 2024/0186883 A1* | 6/2024 | Shi | .................... | H02M 1/0058 |
| 2024/0339934 A1* | 10/2024 | Zhang | ............. | H02M 3/33584 |
| 2024/0405693 A1* | 12/2024 | Reis | ....................... | H02M 1/007 |

* cited by examiner

WIDE RANGE OUTPUT VOLTAGE CONTROL METHOD FOR DUAL ACTIVE BRIDGE TOPOLOGY WITH HIGH EFFICIENCY

BACKGROUND

Many functions of modern devices in automotive, consumer, and industrial applications, such as driving an electric motor or an electric machine, rely on power semiconductor devices. For example, Insulated Gate Bipolar Transistors (IGBTs), Metal Oxide Semiconductor Field Effect Transistors (MOSFETs), and diodes, to name a few, have been used for various applications including, but not limited to, switches in power supplies and power converters.

A transistor typically comprises a semiconductor structure configured to conduct a load current along a load current path between two load terminal structures of the transistor. In other words, the load current flows through a semiconductor channel of the transistor. Further, the load current may be controlled by a control electrode, sometimes referred to as a gate electrode, of the transistor. The control electrode controls a state of the semiconductor channel. For example, upon receiving a corresponding control signal from, for example, a gate driver, the control electrode may set its transistor in one of a conducting state or a blocking state. Accordingly, the semiconductor structure behaves like a switch with on and off states (e.g., conducting and blocking states, respectively).

Usually, a power inverter is composed of two complementary transistors (e.g., a high-side transistor and a low-side transistor) for each load phase, where the two complementary transistors form a half-bridge to drive an output pad connected to a load. A gate driver, used for driving the two complementary transistors, may be supplied with a fixed positive voltage by a positive supply rail and a fixed negative voltage by a negative supply rail. The positive supply rail may be connected to the output pad via the high-side transistor of the two complementary transistors to supply load current to the load, and the negative supply rail may be connected to the output pad via the low-side transistor of the two complementary transistors to sink load current from the load. The two complementary transistors may be complementarily turned on and off to avoid cross-conduction.

Accordingly, the load current, also referred to as a phase current, may be controlled by driving the two complementary transistors. The amplitude of the control signal received from the gate driver for each transistor may be varied to drive the two complementary transistors between switching states. Doing so, in turn, drives the load. For example, a gate-source voltage Vgs of a MOSFET is typically driven down to approximately zero to turn off the MOSFET and is typically driven to a maximum value to fully turn on the MOSFET. For this reason, the gate-source voltage Vgs may be referred to as a control voltage.

During a running operation, a load may be driven according to a load control algorithm to achieve a desired performance corresponding to an electrical frequency of the control signals.

SUMMARY

In some implementations, a dual active bridge circuit includes a primary side circuit configured to be coupled to a power source for receiving an input voltage and an input current, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage and an output current, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current; and a control circuit configured to drive each of the first high-side transistor, the first low-side transistor, the second high-side transistor, and the second low-side transistor between respective switching states to control the voltage differential across the energy transfer inductor, wherein the control circuit is configured to drive the first high-side transistor and the first low-side transistor in a complementary manner based on a first duty cycle, wherein the control circuit is configured to drive the second high-side transistor and the second low-side transistor in a complementary manner based on a second duty cycle, wherein the control circuit is configured to drive the first high-side transistor and the second high-side transistor with a same duty cycle, wherein the control circuit is configured to drive the second high-side transistor with a phase shift relative to the first high-side transistor, and wherein the control circuit is configured to determine a control variable based on at least one of the output voltage or the output current, multiply the control variable by a scaling factor to determine the first duty cycle and the second duty cycle, and generate a plurality of control signals based on the control variable, the first duty cycle, and the second duty cycle for driving the first high-side transistor, the first low-side transistor, the second high-side transistor, and the second low-side transistor between the respective switching states.

In some implementations, a system for controlling a dual active bridge converter includes a regulator circuit comprising at least one of a voltage regulator or a current regulator, wherein the regulator circuit is configured to determine a control variable based on at least one of an output voltage or an output current of the dual active bridge converter; and a pulse-width modulation (PWM) generator comprising a plurality of outputs coupled to a plurality of switches of the dual active bridge converter, wherein the PWM generator is configured to drive a first high-side switch and a first low-side switch of a first half-bridge of the dual active bridge converter in a complementary manner based on a first duty cycle, wherein the PWM generator is configured to drive a second high-side switch and a second low-side switch a second half-bridge of the dual active bridge converter in a complementary manner based on a second duty cycle, wherein the PWM generator is configured to drive the first high-side switch and the second high-side switch with a same duty cycle, wherein the PWM generator is configured to drive the second high-side switch with a phase shift relative to the first high-side switch, wherein the regulator circuit is configured to multiply the control variable by a scaling factor to determine the first duty cycle and the second duty cycle, and wherein the PWM generator is configured to receive the control variable, the first duty cycle, and the second duty cycle, generate a plurality of control signals based on the control variable, the first duty cycle, and the second duty cycle for driving the plurality of switches of the dual active bridge converter, and output the plurality of control signals via the plurality of outputs.

In some implementations, a method for controlling a dual active bridge converter includes detecting at least one of an output voltage or an output current of the dual active bridge converter; determining a control variable based on at least one of an output voltage or an output current of the dual active bridge converter and based on one or more reference values; driving a first high-side switch and a first low-side switch of a first half-bridge of the dual active bridge converter in a complementary manner based on a first duty cycle; driving a second high-side switch and a second low-side switch a second half-bridge of the dual active bridge converter in a complementary manner based on a second duty cycle, wherein the first high-side switch and the second high-side switch are driven with a same duty cycle, and wherein the second high-side switch is driven with a phase shift relative to the first high-side switch; determining the first duty cycle and the second duty cycle by multiplying the control variable by a scaling factor; and generating a plurality of control signals based on the control variable, the first duty cycle, and the second duty cycle for driving a plurality of switches of the dual active bridge converter, wherein the plurality of switches include the first high-side switch, the first low-side switch, the second high-side switch, and the second low-side switch.

BRIEF DESCRIPTION OF THE DRAWINGS

Implementations are described herein making reference to the appended drawings.

DETAILED DESCRIPTION

Figure 1:
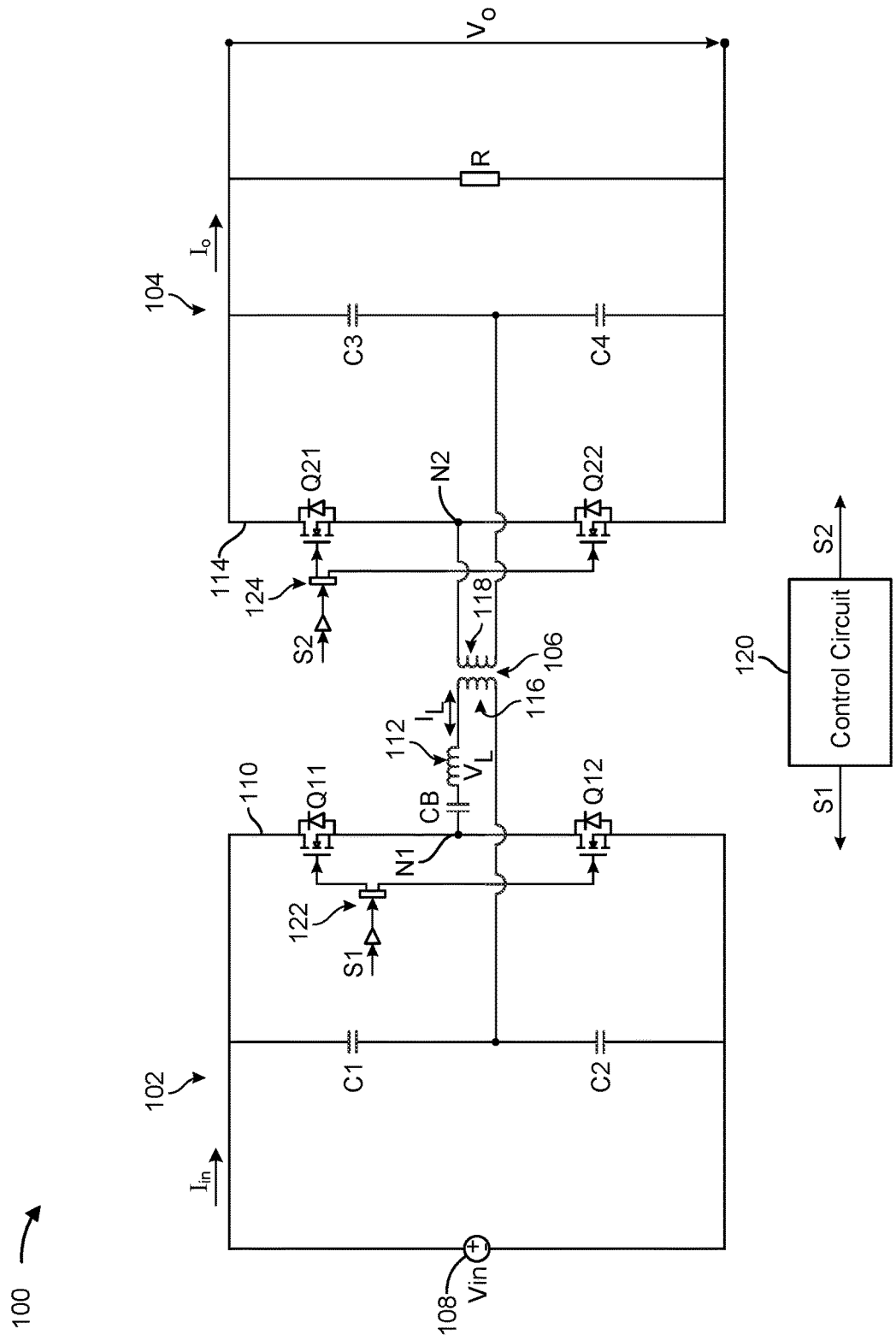
FIG. 1 illustrates a schematic diagram of a dual active bridge (DAB) circuit according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A transistor can be referred to as a power switch, a logic switch, or a transistor switch that may be used to drive a current, such as a load current. In particular, a power transistor is a power semiconductor device that may be used to drive a load current. The power transistor includes a first load terminal (e.g., a source or an emitter) and a second load terminal (e.g., a drain or a collector). Additionally, a load current path of the power transistor may be controlled by a control electrode, sometimes referred to as a gate, connected to a control terminal of the power transistor. A load current path of the power transistor is a gate-controlled conductive channel whose conductivity may be controlled by a control voltage applied to the control electrode of the power transistor. For example, the power transistor can be turned on or off by activating and deactivating its control electrode. For example, applying a positive voltage across a gate and a source of a MOSFET will keep the MOSFET in its "on" state, while applying a voltage of approximately zero or slightly negative across the gate and the source of the MOSFET will cause the MOSFET to turn "off."

There is a turn-on process and a turn-off process for switching a transistor on and off. During the turn-on process of an n-channel transistor, a gate driver may be used to provide (e.g., source) a gate current (e.g., an ON current) to a gate of the n-channel transistor in order to charge a gate voltage to a sufficient voltage to turn on the n-channel transistor. In contrast, during the turn-off process of the n-channel transistor, the gate driver is used to draw (e.g., sink) a gate current (e.g., an OFF current) from the gate of the n-channel transistor in order to discharge the gate voltage sufficiently to turn off the n-channel transistor. A voltage pulse may be output from the gate driver as a control signal according to a pulse-width modulation (PWM) scheme. Thus, the control signal may be switched between an ON voltage level and an OFF voltage level during a PWM cycle for controlling the n-channel transistor. This in turn charges and discharges the gate voltage to turn on and turn off the n-channel transistor, respectively.

The opposite is true for a p-channel transistor. The gate driver may be used to draw (e.g., sink) a gate current (e.g., an ON current) from a gate of the p-channel transistor in order to discharge the gate voltage to a sufficient voltage to turn on the p-channel transistor. In contrast, during the turn-off process of the p-channel transistor, the gate driver is used to provide (e.g., source) a gate current (e.g., an OFF current) to the gate of the p-channel transistor in order to charge the gate voltage of the p-channel transistor sufficiently to turn off the p-channel transistor. A control signal applied to the gate of the p-channel transistor may be switched between an ON voltage level and an OFF voltage level during a PWM cycle for controlling the p-channel transistor. This in turn charges and discharges the gate voltage to turn on and turn off the p-channel transistor, respectively.

For both n-channel and p-channel transistors, the n-channel and p-channel transistors are off when the gate-source voltage Vgs is approximately a zero value or below a threshold voltage and the n-channel and p-channel transistors are on when the gate-source voltage Vgs is equal to or greater than the threshold voltage.

For driving a load in this manner, two transistors are typically arranged in a half-bridge configuration, including a high-side transistor and a low-side transistor. The high-side transistor may be a p-channel transistor connected to a high-side supply potential and the low-side transistor may be an n-channel transistor connected to a low-side supply potential. In some implementations, the high-side transistor and the low-side transistor may be of a same transistor type (e.g., both n-channel type or both p-channel type).

A load current is said to be a positive load current when the load current is flowing from a half-bridge toward the load, and a load current is said to be negative when the load current is flowing away from the load toward the half-bridge. A high-side transistor, when on, is responsible for conducting a positive load current in order to source the load current to the load while the high-side transistor's complementary, low-side transistor is turned off (e.g., the low-side transistor is in blocking or high impedance mode). In order to sink load current from the load, the roles of the high-side and low-side transistors are reversed. Here, the low-side transistor, when on, is responsible for conducting a negative load current in order to sink the load current from the load while the low-side transistor's complementary, high-side transistor is turned off (e.g., the high-side transistor is in blocking or high impedance mode). The two complementary transistors are typically switched such that both are not turned on at the same time.

Transistors may include insulated gate bipolar transistors (IGBTs) and MOSFETs (e.g., Si MOSFETs or SiC MOSFETs), among other examples. One type of transistor may be substituted for another type of transistor. In this context, when a MOSFET is substituted for an IGBT, the MOSFET's drain may be substituted for the IGBT's collector, the MOSFET's source may be substituted for the IGBT's emitter, the MOSFETs drain-source voltage Vds may be substituted for the IGBT's collector-emitter voltage Vce, and the MOSFET's gate-source voltage Vgs may be substituted for the IGBT's gate-emitter voltage Vge, or vice versa, in any one of the examples described herein.

Some implementations described in this disclosure pertain to, without being limited to, half-bridges arranged in a dual active bridge (DAB) topology. The half-bridges are arranged to form a DAB converter. The DAB converter is a bidirectional DC-DC converter with similar primary side and secondary side bridge topologies. The DAB converter further includes a high frequency transformer and an energy transfer inductor. The inductance of the energy transfer inductor may represent leakage inductance of the transformer plus any external energy transfer inductance. Control signals are applied to the half-bridges in a manner to generate a voltage differential across the energy transfer inductance and direct the stored energy of the energy transfer inductance. In other words, the control signals are applied to the half-bridges in order to control a power flow across the transformer between the primary side and secondary side of the DAB converter. In some cases, the power flow in the DAB converter may be directed by phase-shifting the control signals of one side of the DAB converter with respect to the control signals of the other side of the DAB converter using phase shift modulation. The control signals may direct power to the transformer such that the leading side of the DAB converter delivers power to the lagging side of the DAB converter. In some instances, the phase shift between the primary side and the secondary side may be zero and still be capable of delivering power, for example, from the primary side to the secondary side.

When a traditional phase-shift method is used in a DAB topology, the switching loss and conduction loss when Vin≠n×Vo with light load (e.g., low-voltage output) is very high, which leads to an incapability of operating across a wide range output voltages. Here, Vin denotes an input voltage of the DAB converter, Vo denotes an output voltage of the DAB converter, and n denotes a transformer turn ratio of the transformer of the DAB converter. Junction temperatures are also very high. As a result of the high switching loss and the high conduction loss, the delivery of power to the load is inefficient. In some cases, one or more transistors may fail due to the high loss, even when operating at light load. Furthermore, the DAB converter may not be capable of providing a desired low-voltage output due to the losses. Some traditional methods utilize an internal phase shift and outer phase shift, called a multi-phase shift, to reduce losses. However, the control logic for a multi-phase shift method is complex and increases costs. In addition, the multi-phase shift method may be used for 3-phase DAB topologies, but the control logic to implement the multi-phase shift method would be complex.

Similarly, for the traditional phase-shift method in a DAB topology, the switching loss and conduction loss at high-voltage output is very high. Junction temperatures are also very high. As a result of the high switching loss and the high conduction loss, the delivery of power to the load is inefficient. Furthermore, the DAB converter may not be capable of providing the desired high-voltage output due to the losses.

Moreover, the traditional phase-shift method in a DAB topology cannot be used over a wide range of output voltages without causing a spike in transistor turn-on current, which further causes high switching and conduction losses. For example, different control methods (e.g., switching algorithms) may be used to handle different output voltage ranges or load ranges. A first PWM switching algorithm may be used for a first control state or a first output voltage range, second PWM switching algorithm may be used for a second control state or a second output voltage range, and a third PWM switching algorithm may be used for a third control state or a third output voltage range. The output voltage ranges may be mutually exclusive of each other. A symmetric PWM switching algorithm may be one type of PWM switching algorithm, and a complementary PWM switching algorithm may be another type of PWM switching algorithm. A state change may occur when shifting between two output voltage ranges, resulting in an operational change between two different control methods. Switching between control methods may result in an abrupt change in duty cycle and/or phase shift angle used for driving the transistors, which may lead to a very high current spike in an inductor current of the energy transfer inductor and to an overshoot of the output voltage. The inductor current corresponds to the transistor turn-on current on the primary side. Thus, the current spike in the inductor current leads to the spike in transistor turn-on current.

As a non-limiting example, the first output voltage range may include 200-450V, the second output voltage range may include 451-700V, and third output voltage range may include 701-900V. When the output voltage of the DAB converter changes from 250V to 460V, the control method may change from the first PWM switching algorithm to the second PWM switching algorithm. The control method change may cause an abrupt change in at least one of an output control variable of a regulator, a duty cycle, and/or a phase angle, which may cause the current spike in the inductor current of the energy transfer inductor. Ideally, the inductor current should be minimized and/or driving to zero during a turn-on of the transistors to minimize the switching and conduction losses, and to improve the efficiency of the DAB converter.

Some implementations disclosed herein are directed to a DAB converter operated in high-voltage output mode that uses a complementary PWM switching algorithm with an outer phase shift to reduce switching losses and/or conduction losses. For example, the complementary PWM switching algorithm with an outer phase shift may be configured to reduce the load currents of the transistors of the primary side at the time the transistors of the primary side are turned on, to reduce the switching losses and/or the conduction losses of the transistors of the primary side. As a result, the efficiency of the DAB converter can be improved while the DAB converter is operated across a full output voltage range of the load/DAB converter (e.g., from 200-900V). The complementary PWM switching algorithm may be used for the full output voltage range. Thus, the DAB converter may be operated across the full output voltage range without a state change in the control method (e.g., without changing between different switching algorithms). Thus, abrupt changes in the output control variable, the duty cycle, and/or the phase angle may be prevented, which may present current spikes in the inductor current of the energy transfer inductor.

A parameter k (e.g., a scaling factor) may be used to derive the duty cycles implemented at the half-bridges of the DAB converter. For example, a regulator circuit may determine a control variable based on at least one of an output voltage or an output current of the DAB converter. Moreover, the regulator circuit may multiply the control variable the scaling factor to determine a first duty cycle and a second duty cycle. The first duty cycle may be used to drive a first half-bridge located on a primary side of the DAB converter, and the second duty cycle may be used to drive a second half-bridge located on a secondary side of the DAB converter. A PWM generator may receive the control variable, the first duty cycle, and the second duty cycle, generate a plurality of control signals based on the control variable, the first duty cycle, and the second duty cycle for driving a plurality of switches of the DAB converter, and output the plurality of control signals via a plurality of outputs to the plurality of switches. The scaling factor may be fixed for the full output voltage range of the DAB converter, or may be variable with dynamic, real-time adjustment. For example, the scaling factor may be determined through a table lookup and interpolation.

In some implementations, the scaling factor may change according to the output voltage and the load. Since different scaling factor values may lead to a different power loss at a particular working point (e.g., a particular output voltage and load), the scaling factor may be adjusted to obtain a highest efficiency and a maximum output power capability at every working point. In a non-liming example, the scaling factor may be varied in a range of scaling factor values between 1 and 20. When using a fixed scaling factor, the DAB converter may provide output power in across the wide output voltage range, but the efficiency and the output power capacity may be limited when compared to the efficiency and the output power capacity when the scaling factor is variable. In either case, the output voltage range of the DAB converter, using a single switching algorithm, can be extended to cover the wide output voltage range in a range of various products. In addition, the wide output voltage range may be extended to cover 200-1000V, which is not possible for a DAB converter with a 3-phase DAB topology.

FIG. 1 illustrates a schematic diagram of a DAB circuit 100 according to one or more implementations. For example, the DAB circuit 100 may be a DAB converter that includes a primary side circuit 102, a secondary side circuit 104, and a transformer 106 that is configured to transfer energy between the primary side circuit 102 and the secondary side circuit 104 while providing galvanic isolation between the primary side circuit 102 and the secondary side circuit 104.

The DAB circuit 100 may be a half-bridge DAB that includes a single half-bridge on the primary side and another single half-bridge on the secondary side. The primary side circuit 102 may be configured to be coupled to a DC power source 108 for receiving an input voltage Vin and an input current Iin from the DC power source 108. In addition, the primary side circuit 102 may include a first half-bridge 110 comprising a first high-side transistor Q11 and a first low-side transistor Q12 electrically coupled at a first node N1. The primary side circuit 102 may further include bridge capacitors C1 and C2 that divide the input voltage Vin to produce a constant mid-point voltage. For example, the bridge capacitors C1 and C2 may be used to produce the constant mid-point voltage at half the input voltage Vin across a primary winding of the transformer 106. The primary side circuit 102 may further include an energy transfer inductor 112 coupled to the first node N1 and configured to provide an inductor current $I_L$ based on a voltage differential $V_L$ across the energy transfer inductor 112. The primary side circuit 102 may further include a blocking capacitor CB that is connected between the first node N1 and the energy transfer inductor 112 to eliminate a DC bias part of the inductor current $I_L$ and to prevent saturation of the energy transfer inductor 112 and the transformer 106. In particular, the blocking capacitor CB may be used to eliminate DC current bias when energy is transferred from the primary side circuit 102 to the secondary side circuit 104.

The secondary side circuit 104 may be configured to provide output power in the form of an output voltage Vo and an output current Io to a load. The output voltage Vo may be represented by a voltage drop across a resistor R. The secondary side circuit 104 may include a second half-bridge 114 comprising a second high-side transistor Q21 and a second low-side transistor Q22 electrically coupled at a second node N2. The secondary side circuit 104 may further include bridge capacitors C3 and C4 used to produce the output voltage Vo based on a voltage across a secondary winding of the transformer 106. The bridge capacitors C3 and C4 may also be configured to smooth the output voltage Vo by reducing ripple. Similar to the use of the blocking capacitor CB of the primary side circuit 102, a blocking capacitor may be added to the secondary side circuit 104 (e.g., coupled to and between the second coil 118 and the second node N2) in order to eliminate DC current bias when energy is transferred from the secondary side circuit 104 to the primary side circuit 102.

The transformer 106 may be configured to transfer energy from the primary side circuit 102 to the secondary side circuit 104 based on the inductor current $I_L$. The transformer 106 includes a first coil 116 (e.g., a primary winding) electrically coupled to the energy transfer inductor 112 for receiving the inductor current $I_L$ and a second coil 118 (e.g., a secondary winding) electrically coupled to the second node N2 of the second half-bridge 114. The first coil 116 may be magnetically coupled to the second coil 118 to enable the energy transfer.

The DAB circuit 100 further includes a control circuit 120 configured to drive each of the first high-side transistor Q11, the first low-side transistor Q12, the second high-side transistor Q21, and the second low-side transistor Q22 between respective switching states according to a switching control algorithm to control the voltage differential $V_L$ across the energy transfer inductor 112. As a result, the control circuit 120 also controls the inductor current $I_L$ and the energy transfer between the primary side circuit 102 and the secondary side circuit 104. For example, the control circuit 120 may generate control signals S1 and S2 that are applied to the half-bridges 110 and 114 in a manner to generate the voltage differential $V_L$ across the energy transfer inductor 112 and direct the stored energy of the energy transfer inductor 112. The DAB circuit 100 may include a first driver circuit 122 that is configured to receive the control signal S1 and control the respective switching states of the first high-side transistor Q11 and the first low-side transistor Q12 based on the control signal S1. The DAB circuit 100 may also include a second driver circuit 124 that is configured to receive the control signal S2 and control the respective switching states of the second high-side transistor Q21 and the second low-side transistor Q22 based on the control signal S2.

The control circuit 120 may be a controller that includes processing circuitry and driver circuitry. In some implementations, the control circuit 120 may include a regulator circuit that includes at least one of a voltage regulator or a current regulator. The regulator circuit may to determine a control variable based on at least one of the output voltage Vo or the output current Io. Additionally, or alternatively, the control circuit 120 may include a PWM generator that is configured to generate the plurality of control signals for driving the first high-side transistor Q11, the first low-side transistor Q12, the second high-side transistor Q21, and the second low-side transistor Q22 between respective switching states according to the switching control algorithm. The PWM generator may implement a single switching control algorithm (e.g., a complementary PWM switching algorithm) for an entire output voltage range of the DAB circuit 100. For example, the entire output voltage range may extend from 200V to 900V or more. In addition, the control circuit 120 may include a memory to store a lookup table that includes a plurality of values for a scaling factor k. The control circuit 120 may retrieve or otherwise determine, from the lookup table, a value for the scaling factor k based on the output voltage Vo, the output current Io, or the output power of the DAB circuit 100. In some implementations, the control circuit 120 may use interpolation to determine the value for the scaling factor k from the plurality of values stored in the lookup table.

The DAB circuit 100 may be operated in a low-voltage output mode or a high-voltage output mode. In low-voltage output mode, the input voltage Vin is greater than a product of the output voltage Vo and a transformer turn ratio n of the transformer 106 (e.g., Vin>Vo×n). Additionally, the DAB circuit 100 may be operated in a first operation mode when Vin≠n×Vo, and may be operated in a second operation mode when Vin=n×Vo. The transformer turn ratio n may be a ratio of a number of turns of the first coil 116 relative to a number of turns of the second coil 118. In high-voltage output mode, the input voltage Vin is less than a product of the output voltage Vo and the transformer turn ratio n of the transformer (e.g., Vo×n>Vin). Additionally, each of the first high-side transistor Q11, the first low-side transistor Q12, the second high-side transistor Q21, and the second low-side transistor Q22 may be connected antiparallel to a corresponding freewheeling diode. The freewheeling diodes may provide an alternative current path for the load current during turn off of a respective transistor in order to prevent high voltage peaks and losses.

The control circuit 120 may implement a complementary PWM switching algorithm to drive the first high-side transistor Q11, the first low-side transistor Q12, the second high-side transistor Q21, and the second low-side transistor Q22 between respective switching states to control the voltage differential $V_L$ across the energy transfer inductor 112. The control circuit 120 may be configured to drive the first high-side transistor Q11 and the first low-side transistor Q12 in a complementary manner such that the first high-side transistor Q11 and the first low-side transistor Q12 are driven in opposite switching states. A dead time may be imposed by the control circuit 120 during which both the first high-side transistor Q11 and the first low-side transistor Q12 are simultaneously off to prevent shoot-through by ensuring that the two transistors of the half-bridge 110 will not be on simultaneously. As a result, duty cycles for the first high-side transistor Q11 and the first low-side transistor Q12 are different. For example, a duty cycle applied to the first low-side transistor Q12 may be is inversely related to a duty cycle applied to the first high-side transistor Q11. In addition, the control circuit 120 may be configured to drive the second high-side transistor Q21 and the second low-side transistor Q22 in a complementary manner, and may also impose a dead time during which both the second high-side transistor Q21 and the second low-side transistor Q22 are simultaneously off to prevent shoot-through. As a result, duty cycles for the second high-side transistor Q21 and the second low-side transistor Q22 are different. For example, a duty cycle applied to the second low-side transistor Q22 may be is inversely related to a duty cycle applied to the second high-side transistor Q21.

The control circuit 120 may drive the first high-side transistor Q11 and the first low-side transistor Q12 in a complementary manner based on a first duty cycle D1. For example, the first duty cycle D1 may be the duty cycle used to drive the first high-side transistor Q11. Thus, the duty cycle used to drive the first low-side transistor Q12 may be based on an inverse of the first duty cycle D1 and an imposed dead time. Alternatively, the first duty cycle D1 may be the duty cycle used to drive the first low-side transistor Q12. The control circuit 120 may drive the second high-side transistor Q21 and the second low-side transistor Q22 in a complementary manner based on a second duty cycle D2. For example, the second duty cycle D2 may be the duty cycle used to drive the second high-side transistor Q21. Thus, the duty cycle used to drive the second low-side transistor Q22 may be based on an inverse of the second duty cycle D2 and an imposed dead time. Alternatively, the second duty cycle D2 may be the duty cycle used to drive the second low-side transistor Q22.

The control circuit 120 may be configured to drive the first high-side transistor Q11 and the second high-side transistor Q21 with a same duty cycle. For example, the first duty cycle D1 may be equal to the second duty cycle D2 in the case that the first duty cycle D1 is the duty cycle of the first high-side transistor Q11 and the second duty cycle D2 is the duty cycle of the second high-side transistor Q21. The control circuit 120 may be configured to drive the first low-side transistor Q12 and the second low-side transistor Q22 with a same duty cycle. For example, the first duty cycle D1 may be equal to the second duty cycle D2 in the case that the first duty cycle D1 is the duty cycle of the first low-side transistor Q12 and the second duty cycle D2 is the duty cycle of the second low-side transistor Q22. In addition, the control circuit 120 may be configured to drive the second high-side transistor Q21 with a first phase shift (e.g., a phase shift angle) relative to the first high-side transistor Q11. The first phase shift may different than zero (e.g., a positive phase shift or a negative phase shift). There may be one or more conditions at which the first phase shift is set to zero.

The control circuit 120 is configured to drive the first half-bridge 110 and the second half-bridge 114 in order to drive the voltage differential $V_L$ across the energy transfer inductor 112 to zero and maintain the voltage differential $V_L$ across the energy transfer inductor 112 at zero for a predetermined interval, causing the inductor current $I_L$ to be clipped at or limited to a reduced current level. In addition, the control circuit 120 is configured to turn on the first high-side transistor Q11 or turn on the first low-side transistor Q12 when the inductor current $I_L$ is equal to or substantially equal to the reduced current level. As a result, the switching losses and/or the conduction losses on the primary side of the DAB circuit 100 may be reduced. For example, because the inductor current $I_L$ may be equal to or substantially equal to the reduced current level when the first high-side transistor Q11 is turned on, the switching losses and/or the conduction losses associated with the first high-side transistor Q11 may be reduced. Alternatively, because the inductor current $I_L$ may be equal to or substantially equal to the reduced current level when the first low-side transistor Q12 is turned on, the switching losses and/or the conduction losses associated with the first low-side transistor Q12 may be reduced.

In addition, the control circuit 120 may determine a control variable φ based on at least one of the output voltage or the output current, multiply the control variable φ by the scaling factor k to determine the first duty cycle D1 and the second duty cycle D2, and generate a plurality of control signals (e.g., PWM driving signals) based on the control variable control variable q, the first duty cycle D1, and the second duty cycle D2 for driving the first high-side transistor Q11, the first low-side transistor Q12, the second high-side transistor Q21, and the second low-side transistor Q22 between respective switching states. In some implementations, the first duty cycle D1 is equal to the control variable φ scaled by the scaling factor k (e.g., D1=k·φ). In some implementations, the second duty cycle D2 is equal to the control variable φ scaled by the scaling factor k (e.g., D2=k·φ). In some implementations, the control variable q is an output control variable generated by a regulator circuit, such as a current regulator or a voltage regulator. In some implementations, the output control variable is a control value to be used as the first phase shift between the first high-side transistor Q11 and the second high-side transistor Q21. In other words, the output control variable may be a control value to be used by the PWM generator as a target phase shift between the first half-bridge and the second half-bridge, or, more particularly, as a target phase shift between the first high-side transistor Q11 and the second high-side transistor Q21.

The PWM generator may receive the control variable q, the first duty cycle D1, and the second duty cycle D1, and generate the plurality of control signals based on the control variable q, the first duty cycle D1, and the second duty cycle D2. The PWM generator may have a plurality of outputs coupled to a plurality of transistors of the DAB circuit 100, and may output the plurality of control signals via the plurality of outputs.

In some implementations, the scaling factor k may be fixed for the entire output voltage range of the DAB circuit 100. Alternatively, the scaling factor may be variable and may be dynamically adjusted in real-time by the control circuit 120 based on one or more input variables, such as the output voltage Vo, the output current Io, the output power, the input voltage Vin, or the input current Iin. For example, the control circuit 120 may include a memory configured to store a lookup table that includes a plurality of values for the scaling factor k. The control circuit 120 may determine the output voltage Vo, the output current Io, or an output power of the DAB circuit 100, for example, using one or more sensors or sensing techniques. For example, one or more current sensors, voltage sensors, shunts, or probes may be used to detect the output voltage Vo, the output current Io, and/or an output power. Additionally, the control circuit 120 may determine, from the lookup table, the scaling factor k based on the output voltage Vo, the output current Io, or the output power, In some implementations, the control circuit 120 may determine the input voltage Vin, the output voltage Vo, and the input current Iin of the DAB circuit 100, and determine, from the lookup table, the scaling factor k based on the input voltage Vin, the output voltage Vo, and the input current In. For example, the input voltage Vin, the output voltage Vo, and the input current Iin may be used as input variables for the lookup table. The control circuit 120 may use the input variables to determine which of the plurality of values from the lookup table to use as the scaling factor k. In some implementations, the control circuit 120 may perform interpolation based on the input variables and the plurality of values to determine a value for the scaling factor k. Thus, the input voltage Vin, the output voltage Vo, and the input current Iin may be used to obtain one value from the lookup table.

In some implementations, the control circuit 120 may determine the input voltage Vin, the output voltage Vo, and the output current Io of the DAB circuit 100, and determine, from the lookup table, the scaling factor k based on the input voltage Vin, the output voltage Vo, and the output current Io. For example, the input voltage Vin, the output voltage Vo, and the output current Io may be used as input variables for the lookup table. The control circuit 120 may use the input variables to determine which of the plurality of values from the lookup table to use as the scaling factor k. In some implementations, the control circuit 120 may perform interpolation based on the input variables and the plurality of values to determine a value for the scaling factor k. Thus, the input voltage Vin, the output voltage Vo, and the output current Io may be used to obtain one value from the lookup table.

In some implementations, the control circuit 120 may vary the scaling factor k based on the output voltage Vo and a load of the DAB circuit 100. The control circuit 120 may determine a value for the scaling factor k based on the plurality of values stored in the lookup table such that power losses of the first high-side transistor Q11, the first low-side transistor Q12, the second high-side transistor Q21, and the second low-side transistor Q22 are minimized for the output voltage Vo and the load. For example, the control circuit 120 may determine the value for the scaling factor k based on the plurality of values such that the voltage differential across the energy transfer inductor 112 is driven to zero during a turn on the first high-side transistor Q11 or during a turn on the first low-side transistor Q12. Additionally, or alternatively, the control circuit 120 may determine the value for the scaling factor k based on the input variables and the plurality of values such that a root-mean-square (RMS) current of the energy transfer inductor 112 is minimized during a turn on the first high-side transistor Q11 or during a turn on the first low-side transistor Q12. Additionally, or alternatively, the control circuit 120 may determine the value for the scaling factor k based on the input variables and the plurality of values such that a turn on current of the transistors, on the primary or the secondary side, is minimized. Additionally, or alternatively, the control circuit 120 may determine the value for the scaling factor k based on the input variables and the plurality of values such that the DAB circuit 100 is maintained in a zero voltage switching (ZVS) mode for the entire output voltage range of the DAB circuit 100.

The control circuit 120 may operate in the first operation mode when Vin≠n×Vo, and may be operated in the second operation mode when Vin=n×Vo. Based on the input voltage Vin being not equal to a product of the output voltage Vo and the transformer turn ratio n (e.g., based on operating in the first operation mode), the control circuit 120 may determine a value for the scaling factor k within a first range of values. Alternatively, based on the input voltage Vin being equal to the product of the output voltage Vo and the transformer turn ratio n (e.g., based on operating in the second operation mode), the control circuit 120 may determine a value for the scaling factor k within a second range of values. The first range of values may extend from a minimum value to an intermediate value that is greater than the minimum value, and the second range of values may extend from the intermediate value to a maximum value that is greater than the intermediate value. For example, the first range of values may include values from 1 to 10, and the second range of values may include values from 11 to 20.

When Vin≠n×Vo, the value of the scaling factor k may be adjusted in order to reduce the turn-on current of a transistor as much as possible (e.g., reduced to zero), thereby reducing the turn-on loss and total loss, and meeting a demand for a wide range of output voltages. While operating in the first operation mode, small values of k within the first range of values, such as 1-5, may be used for light loads, and larger values of k within the first range of values, such as 6-10, may be used for heavy loads. When Vin=n×Vo, a large value may be used for the scaling factor k in the full load range, and the value of the scaling factor k may be adjusted within the second range of values in order to achieve pure phase shift control as soon as possible to provide high efficiency.

In some implementations, the control circuit 120 may add an offset value for determining the first duty cycle D1 and the second duty cycle D2. For example, the control circuit 120 may calculate or otherwise determine a product of the control variable q and the scaling factor k, and add an offset value to the product to determine the first duty cycle D1 and the second duty cycle D2. For example, $D1=D2=\varphi \times k+b$, where b denotes the offset value. The offset value may be stored in the lookup table. In some implementations, different offset values may be associated with different values of the scaling factor k, or different offset values may be associated with different output voltages or different loads.

In some implementations, the scaling factor k may be a first scaling factor k1, and the first phase shift (e.g., the phase shift between first high-side transistor Q11 and the second high-side transistor Q21) may be determined based on the control variable φ and a second scaling factor k2. For example, the control circuit 120 may multiply the control variable φ by the first scaling factor k1 to determine the first duty cycle D1 and the second duty cycle D2 (e.g., D1=D2=φ×k1). In addition, the control circuit 120 may multiply the control variable φ by the second scaling factor k2 to determine a target phase shift between the first half-bridge and the second half-bridge. The PWM generator may generate the plurality of control signals based on the target phase shift, the first duty cycle D1, and the second duty cycle D2 for driving the first high-side transistor Q11, the first low-side transistor Q12, the second high-side transistor Q21, and the second low-side transistor Q22 between the respective switching states.

As a result, the switching and/or conduction losses of the first high-side transistor Q11 and/or the first low-side transistor Q12 may be reduced. Thus, the switching and/or conduction losses on the primary side as a whole can be reduced, resulting in a more efficient operation of the DAB circuit 100. Moreover, the switching and/or conduction losses of the second high-side transistor Q21 and/or the second low-side transistor Q22 may be reduced. Thus, the switching and/or conduction losses on the secondary side as a whole can be reduced, resulting in a more efficient operation of the DAB circuit 100.

As indicated above, FIG. 1 is provided as an example. Other examples may differ from what is described with regard to FIG. 1. The number and arrangement of components shown in FIG. 1 are provided as an example. In practice, the DAB circuit 100 may include additional components, fewer components, different components, or differently arranged components than those shown in FIG. 1. Two or more components shown in FIG. 1 may be implemented within a single component, or a single component shown in FIG. 1 may be implemented as multiple, distributed components. Additionally, or alternatively, a set of components (e.g., one or more components) of the DAB circuit 100 may perform one or more functions described as being performed by another set of components of the DAB circuit 100. For example, the switching control algorithms described above for the low-voltage output mode and the high-voltage output mode may be extended to full-bridge DAB circuits and multi-phase DAB circuits that have three or more phases.

Figure 2:
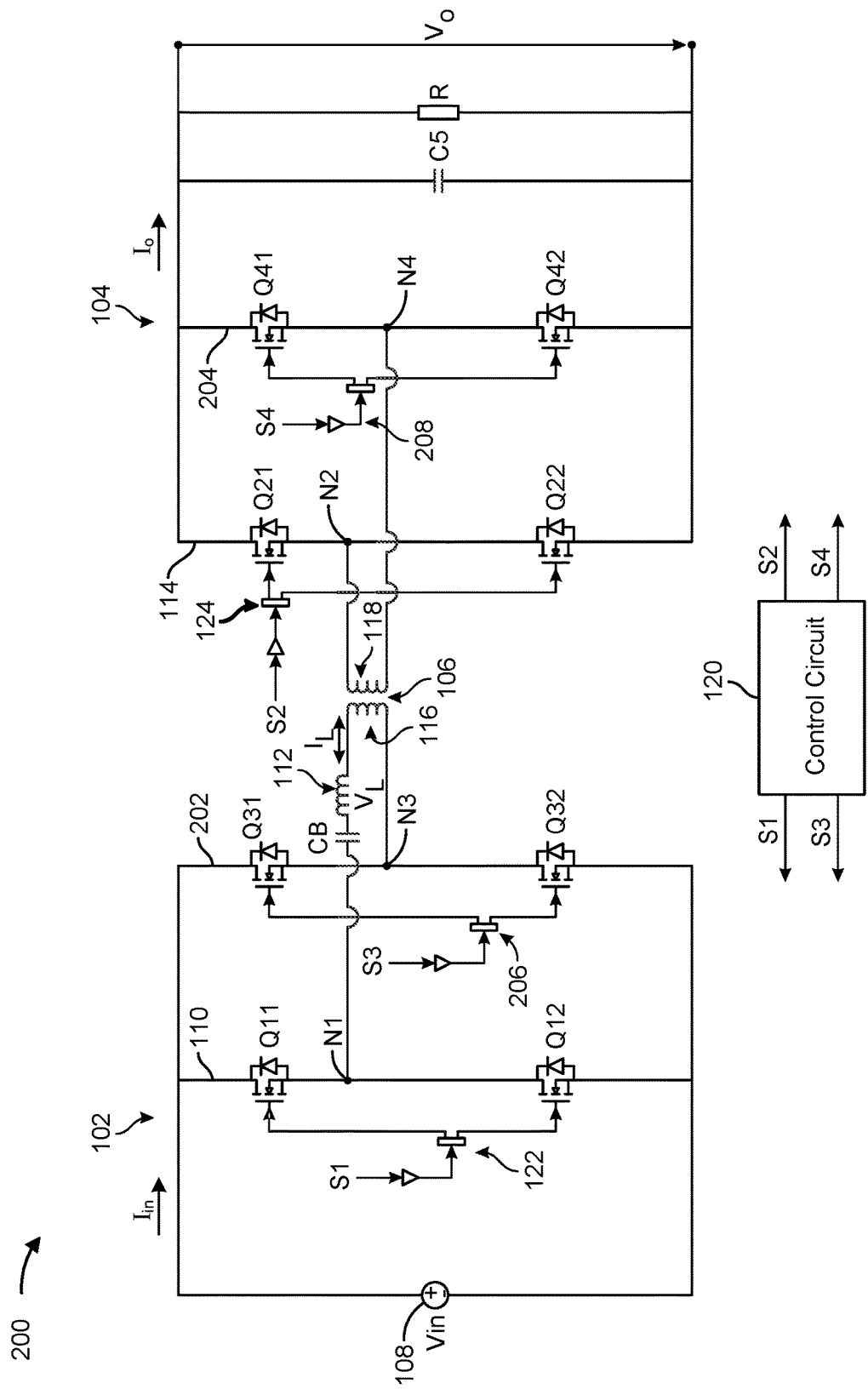
FIG. 2 illustrates a schematic diagram of a DAB circuit according to one or more implementations.

FIG. 2 illustrates a schematic diagram of a DAB circuit 200 according to one or more implementations. For example, the DAB circuit 200 may be a DAB converter that includes the primary side circuit 102, the secondary side circuit 104, and the transformer 106 that is configured to transfer energy between the primary side circuit 102 and the secondary side circuit 104 while providing galvanic isolation between the primary side circuit 102 and the secondary side circuit 104.

The DAB circuit 200 may be a full-bridge DAB that includes a full half-bridge (e.g., two half-bridges) on the primary side and another full half-bridge (e.g., two half-bridges) on the secondary side. Thus, the DAB circuit 200 is similar to the DAB circuit 100 described in connection with FIG. 1, with additional components for driving the full-bridges.

In addition to the first half-bridge 110, the primary side circuit 102 comprises a third half-bridge 202 comprising a third high-side transistor Q31 and a third low-side transistor Q32 electrically coupled at a third node N3 that is electrically coupled to the energy transfer inductor 112 (e.g., through the first coil 116).

In addition, while not shown, a blocking capacitor may be added to the secondary side circuit 104 (e.g., coupled to and between the second coil 118 and the second node N2) in order to eliminate DC current bias when energy is transferred from the secondary side circuit 104 to the primary side circuit 102.

In addition to the second half-bridge 114, the secondary side circuit 104 further comprises a fourth half-bridge 204 comprising a fourth high-side transistor Q41 and a fourth low-side transistor Q42 electrically coupled at a fourth node N4 that is electrically coupled to the second coil 118. The secondary side circuit 104 may include a bridge capacitor C5 that is configured to stabilize the output voltage Vo.

The control circuit 120 is configured to drive each of the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 between respective switching states according to a switching control algorithm to control the voltage differential $V_L$ across the energy transfer inductor 112. As a result, the control circuit 120 also controls the inductor current $I_L$ and the energy transfer between the primary side circuit 102 and the secondary side circuit 104. For example, the control circuit 120 may generate control signals S1, S2, S3, and S4 that are applied to the half-bridges 110, 114, 202, and 204, respectively, in a manner to generate the voltage differential $V_L$ across the energy transfer inductor 112 and direct the stored energy of the energy transfer inductor 112. The DAB circuit 200 may include a third driver circuit 206 that is configured to receive the control signal S3 and control the respective switching states of the third high-side transistor Q31 and the third low-side transistor Q32 based on the control signal S3. The DAB circuit 200 may also include a fourth driver circuit 208 that is configured to receive the control signal S4 and control the respective switching states of the fourth high-side transistor Q41 and the fourth low-side transistor Q42 based on the control signal S4.

The control circuit 120 may implement a complementary PWM switching algorithm to drive the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 between respective switching states to control the voltage differential $V_L$ across the energy transfer inductor 112.

The control circuit 120 may drive the first half-bridge 110 and the second half-bridge 114 in a similar manner as described above in connection with FIG. 1. In addition, the control circuit 120 may drive the third high-side transistor Q31 and the third low-side transistor Q32 in a complementary manner such that the third high-side transistor Q31 and the third low-side transistor Q32 are driven in opposite switching states. A dead time may be imposed by the control circuit 120 during which both the third high-side transistor Q31 and the third low-side transistor Q32 are simultaneously off to prevent shoot-through. In addition, the control circuit 120 may be configured to drive the fourth high-side transistor Q41 and the fourth low-side transistor Q42 in a complementary manner, and may also impose a dead time during which both the fourth high-side transistor Q41 and the fourth low-side transistor Q42 are simultaneously off to prevent shoot-through.

The control circuit 120 may drive the third high-side transistor Q31 and the third low-side transistor Q32 in a complementary manner based on a third duty cycle D3. The control circuit 120 may drive the fourth high-side transistor Q41 and the fourth low-side transistor Q42 in a complementary manner based on a fourth duty cycle D4. Additionally, the control circuit 120 may be configured to drive the first high-side transistor Q11, the second high-side transistor Q21, the third high-side transistor Q31, and the fourth high-side transistor Q41 with a same duty cycle (e.g., D1=D2=D3=D4). In addition, the control circuit 120 may be configured to drive the fourth high-side transistor Q41 with a second phase shift relative to the third high-side transistor Q31, with the second phase shift being equal to the first phase shift. Moreover, the control circuit 120 may drive the first high-side transistor Q11 and the third high-side transistor Q31 with an equidistant phase shift relative to each other. In other words, the control circuit 120 may drive the first high-side transistor Q11 and the third high-side transistor Q31 180° out-of-phase with respect to each other. Similarly, the second high-side transistor Q21 and the fourth high-side transistor Q41 may be driven 180° out-of-phase with respect to each other.

The control circuit 120 is configured to drive the first half-bridge 110, the second half-bridge 114, the third half-bridge 202, and the fourth half-bridge 204 in order to drive the voltage differential $V_L$ across the energy transfer inductor 112 to zero and maintain the voltage differential $V_L$ across the energy transfer inductor 112 at zero for a predetermined interval, causing the inductor current $I_L$ to be clipped at or limited to a reduced current level. In addition, the control circuit 120 is configured to turn on the first high-side transistor Q11 or turn on the first low-side transistor Q12 when the inductor current $I_L$ is equal to or substantially equal to the reduced current level. As a result, the switching losses and/or the conduction losses on the primary side of the DAB circuit 200 may be reduced. For example, because the inductor current $I_L$ may be equal to or substantially equal to the reduced current level when the first high-side transistor Q11 is turned on, the switching losses and/or the conduction losses associated with the first high-side transistor Q11 may be reduced. Alternatively, because the inductor current $I_L$ may be equal to or substantially equal to the reduced current level when the first low-side transistor Q12 is turned on, the switching losses and/or the conduction losses associated with the first low-side transistor Q12 may be reduced.

In addition, the control circuit 120 may determine the control variable φ based on at least one of the output voltage or the output current, multiply the control variable φ by the scaling factor k to determine the first duty cycle D1, the second duty cycle D2, the third duty cycle D3, and the fourth duty cycle D4, and generate a plurality of control signals (e.g., PWM driving signals) based on the control variable control variable q, the first duty cycle D1, the second duty cycle D2, the third duty cycle D3, and the fourth duty cycle D4 for driving the each of the transistors between respective switching states. The control circuit 120 may determine the scaling factor k, the first duty cycle D1, the second duty cycle D2, the third duty cycle D3, and the fourth duty cycle D4 in a similar manner described above in connection with FIG. 1.

As a result, the switching and/or conduction losses of the transistors may be reduced. Thus, the switching and/or conduction losses on the primary side and/or the secondary side as a whole can be reduced, resulting in a more efficient operation of the DAB circuit 200.

As indicated above, FIG. 2 is provided as an example. Other examples may differ from what is described with regard to FIG. 2. The number and arrangement of components shown in FIG. 2 are provided as an example. In practice, the DAB circuit 200 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the DAB circuit 200 may perform one or more functions described as being performed by another set of components of the DAB circuit 200. For example, the switching control algorithms described above for the low-voltage output mode and the high-voltage output mode may be extended to multi-phase DAB circuits that have three or more phases.

Figure 3:
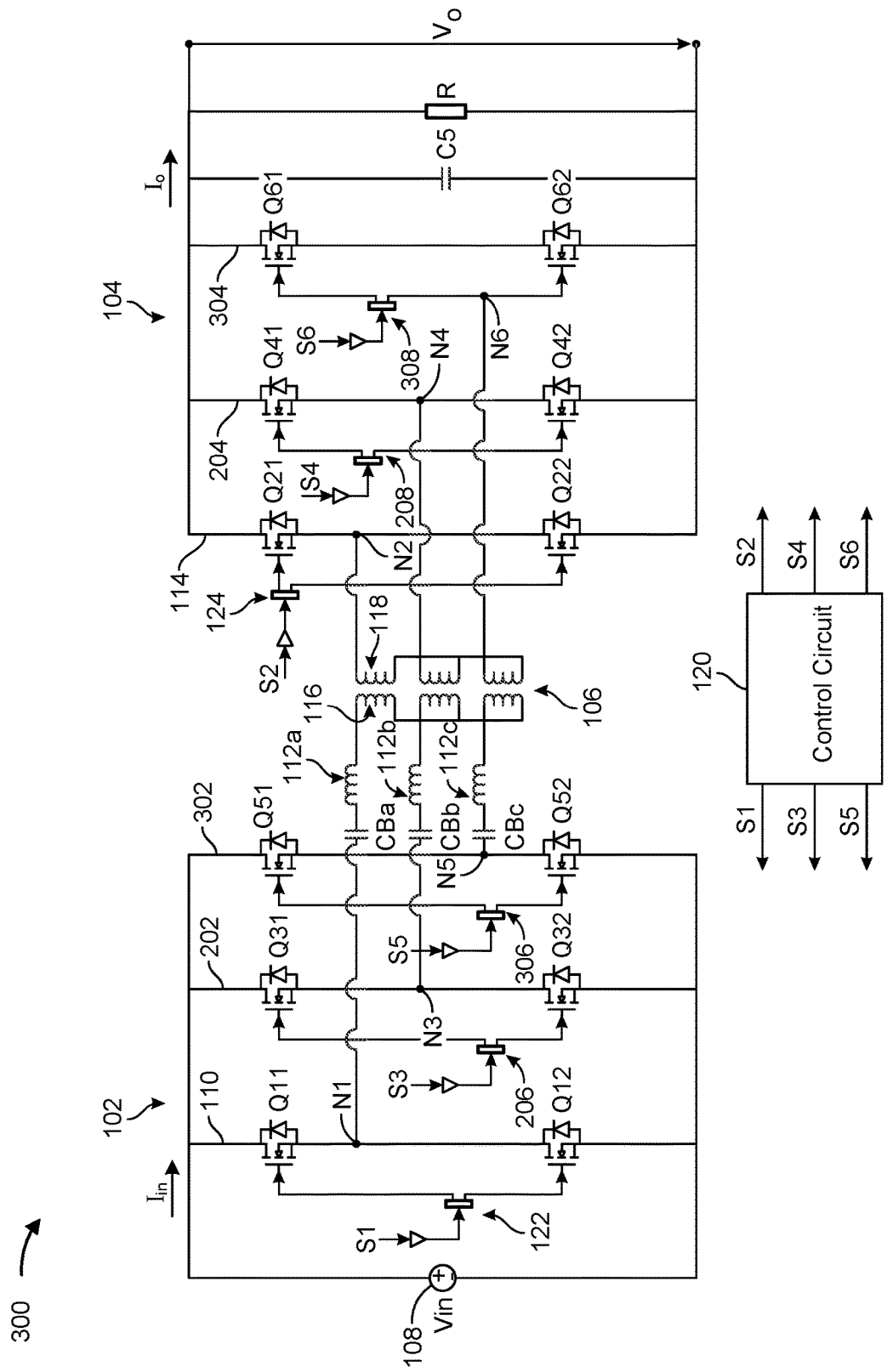
FIG. 3 illustrates a schematic diagram of a DAB circuit according to one or more implementations.

FIG. 3 illustrates a schematic diagram of a DAB circuit 300 according to one or more implementations. For example, the DAB circuit 300 may be a DAB converter that includes the primary side circuit 102, the secondary side circuit 104, and the transformer 106 that is configured to transfer energy between the primary side circuit 102 and the secondary side circuit 104 while providing galvanic isolation between the primary side circuit 102 and the secondary side circuit 104.

The DAB circuit 300 may be a three-phase DAB that includes three half-bridges for generating three phase currents on the primary side and another three half-bridge for generating three phase currents on the secondary side. Thus, the DAB circuit 300 is similar to the DAB circuits 100 and 200 described in connection with FIGS. 1 and 2, with additional components for driving the six half-bridges.

The transformer 106 may include three sub-transformers, each comprising a respective pair of primary and secondary coils. Each sub-transformer may be configured to transfer energy corresponding to a respective phase of the three-phase DAB. For example, the sub-transformers may be connected to the primary side circuit 102 and the secondary side circuit 104 by a Y-connection configuration, as shown in FIG. 3. In some implementations, the sub-transformers may be connected to the primary side circuit 102 and the secondary side circuit 104 by a different connection configuration, such as a delta-connection configuration.

In addition to the first half-bridge 110 and the third half-bridge 202, the primary side circuit 102 comprises a fifth half-bridge 302 comprising a fifth high-side transistor Q51 and a fifth low-side transistor Q52 electrically coupled at a fifth node N5 that is electrically coupled indirectly to the energy transfer inductor 112 (e.g., through the first coil 116).

In addition to the second half-bridge 114 and the fourth half-bridge 204, the secondary side circuit 104 further comprises a sixth half-bridge 304 comprising a sixth high-side transistor Q61 and a sixth low-side transistor Q62 electrically coupled at a sixth node N6 that is electrically coupled indirectly to the second coil 118.

The DAB circuit 300 includes three energy transfer inductors 112a, 112b, and 112c, with each of the energy transfer inductors 112a, 112b, and 112c being respectively coupled to one of the sub-transformers directly and to the other sub-transformers indirectly through the Y-connection. The DAB circuit 300 may also include three blocking capacitors CBa, CBb, and CBc that are respectively coupled to one of the first half-bridge 110, the third half-bridge 202, or the fifth half-bridge 302. Controlling a respective voltage differential $V_L$ across each of the energy transfer inductors 112a, 112b, and 112c, controls the energy transfer for each of the three phases, respectively. In addition, while not shown, additional blocking capacitors may be added to the secondary side circuit 104 between each secondary coil and each half-bridge in order to eliminate DC current bias when energy is transferred from the secondary side circuit 104 to the primary side circuit 102.

The control circuit 120 is configured to drive each of the first high-side transistor Q11, the first low-side transistor Q12, the second high-side transistor Q21, the second low-side transistor Q22, the third high-side transistor Q31, the third low-side transistor Q32, the fourth high-side transistor Q41, the fourth low-side transistor Q42, the fifth high-side transistor Q51, the fifth low-side transistor Q52, the sixth high-side transistor Q61, and the sixth low-side transistor Q62 between respective switching states according to a switching control algorithm to control the voltage differential $V_L$ across the energy transfer inductor 112. As a result, the control circuit 120 also controls the inductor currents $I_L$ of the energy transfer inductors 112a, 112b, and 112c and controls the energy transfer between the primary side circuit 102 and the secondary side circuit 104. For example, the control circuit 120 may generate control signals S1, S2, S3, S4, S5, and S6 that are applied to the half-bridges 110, 114, 202, 204, 302, and 304 respectively, in a manner to generate the voltage differentials $V_L$ across the energy transfer inductors 112a, 112b, and 112c and direct the stored energy of the energy transfer inductors 112a, 112b, and 112c. The DAB circuit 300 may include a fifth driver circuit 306 that is configured to receive the control signal S5 and control the respective switching states of the fifth high-side transistor Q51 and the fifth low-side transistor Q52 based on the control signal S5. The DAB circuit 300 may also include a sixth driver circuit 308 that is configured to receive the control signal S6 and control the respective switching states of the sixth high-side transistor Q61 and the sixth low-side transistor Q62 based on the control signal S6.

The control circuit 120 may implement a complementary PWM switching algorithm to drive the first high-side transistor Q11, the first low-side transistor Q12, the second high-side transistor Q21, the second low-side transistor Q22, the third high-side transistor Q31, the third low-side transistor Q32, the fourth high-side transistor Q41, the fourth low-side transistor Q42, the fifth high-side transistor Q51, the fifth low-side transistor Q52, the sixth high-side transistor Q61, and the sixth low-side transistor Q62 between respective switching states to control the voltage differentials $V_L$ across the energy transfer inductors 112a, 112b, and 112c.

The control circuit 120 may drive the first half-bridge 110 and the second half-bridge 114 in a similar manner as described above in connection with FIG. 1, and may drive the third half-bridge 202 and the fourth half-bridge 204 in a similar manner as described above in connection with FIG. 2. In addition, the control circuit 120 may drive the fifth high-side transistor Q51 and the fifth low-side transistor Q52 in a complementary manner such that the fifth high-side transistor Q51 and the fifth low-side transistor Q52 are driven in opposite switching states. A dead time may be imposed by the control circuit 120 during which both the fifth high-side transistor Q51 and the fifth low-side transistor Q52 are simultaneously off to prevent shoot-through. In addition, the control circuit 120 may be configured to drive the sixth high-side transistor Q61 and the sixth low-side transistor Q62 in a complementary manner, and may also impose a dead time during which both the sixth high-side transistor Q61 and the sixth low-side transistor Q62 are simultaneously off to prevent shoot-through.

The control circuit 120 may drive the fifth high-side transistor Q51 and the fifth low-side transistor Q52 in a complementary manner based on a fifth duty cycle D5. The control circuit 120 may drive the sixth high-side transistor Q61 and the sixth low-side transistor Q62 in a complementary manner based on a fourth duty cycle D6. Additionally, the control circuit 120 may be configured to drive the first high-side transistor Q11, the second high-side transistor Q21, the third high-side transistor Q31, the fourth high-side transistor Q41, the fifth high-side transistor Q51, and the sixth high-side transistor Q61 with a same duty cycle (e.g., D1=D2=D3=D4=D5=D6). In addition, the control circuit 120 may be configured to drive the sixth high-side transistor Q61 with a third phase shift relative to the fifth high-side transistor Q51, with the third phase shift being equal to the first phase shift and the second phase shift. Moreover, the control circuit 120 may drive the first high-side transistor Q11, the third high-side transistor Q31, and the fifth high-side transistor Q51 with an equidistant phase shift relative to each other (e.g., 120° out-of-phase with respect to each other). Similarly, the second high-side transistor Q21, the fourth high-side transistor Q41, and the sixth high-side transistor Q61 may be driven 120° out-of-phase with respect to each other.

The control circuit 120 is configured to drive the first half-bridge 110, the second half-bridge 114, the third half-bridge 202, the fourth half-bridge 204, the fifth half-bridge 302, and the sixth half-bridge 304 in order to drive the voltage differentials $V_L$ across the energy transfer inductors 112a, 112b, and 112c to zero and maintain the voltage differentials $V_L$ at zero for a respective predetermined interval. In other words, the voltage differential $V_L$ across each energy transfer inductor 112a, 112b, and 112c may be maintained at zero for a different respective predetermined interval. As a result, the inductor current $I_L$ for each energy transfer inductor 112a, 112b, and 112c is clipped at or limited to a reduced current level during the respective predetermined interval. In addition, the control circuit 120 is configured to turn on the first high-side transistor Q11 or turn on the first low-side transistor Q12 when the inductor current $I_L$ of the energy transfer inductor 112a is equal to or substantially equal to the reduced current level, turn on the third high-side transistor Q31 or turn on the third low-side transistor Q32 when the inductor current $I_L$ of the energy transfer inductor 112b is equal to or substantially equal to the reduced current level, and turn on the fifth high-side transistor Q51 or turn on the fifth low-side transistor Q52 when the inductor current $I_L$ of the energy transfer inductor 112c is equal to or substantially equal to the reduced current level.

In addition, the control circuit 120 may determine the control variable q based on at least one of the output voltage or the output current, multiply the control variable φ by the scaling factor k to determine the first duty cycle D1, the second duty cycle D2, the third duty cycle D3, the fourth duty cycle D4, the fifth duty cycle D5, and the sixth duty cycle D6, and generate a plurality of control signals (e.g., PWM driving signals) based on the control variable control variable q, the first duty cycle D1, the second duty cycle D2, the third duty cycle D3, the fourth duty cycle D4, the fifth duty cycle D5, and the sixth duty cycle D6 for driving the each of the transistors between respective switching states. The control circuit 120 may determine the scaling factor k, the first duty cycle D1, the second duty cycle D2, the third duty cycle D3, the fourth duty cycle D4, the fifth duty cycle D5, and the sixth duty cycle D6 in a similar manner described above in connection with FIG. 1.

As a result, the switching losses and/or the conduction losses on the primary side of the DAB circuit 300 may be reduced. For example, because the inductor current $I_L$ of the energy transfer inductor 112a may be equal to or substantially equal to the reduced current level when the first high-side transistor Q11 is turned on, the switching losses and/or the conduction losses associated with the first high-side transistor Q11 may be reduced. Alternatively, because the inductor current $I_L$ of the energy transfer inductor 112a may be equal to or substantially equal to the reduced current level when the first low-side transistor Q12 is turned on, the switching losses and/or the conduction losses associated with the first low-side transistor Q12 may be reduced.

As a result, the switching and/or conduction losses of the transistors may be reduced. Thus, the switching and/or conduction losses on the primary side and/or the secondary side as a whole can be reduced, resulting in a more efficient operation of the DAB circuit 300.

Figure 4:
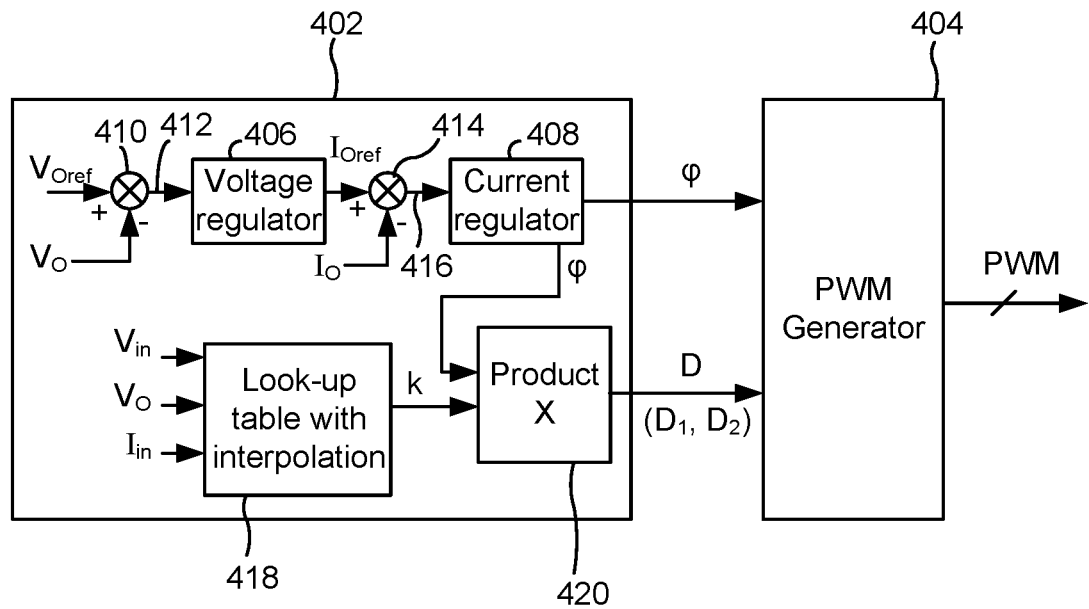
FIG. 4 illustrates a schematic block diagram of a control circuit according to one or more implementations.

As indicated above, FIG. 3 is provided as an example. Other examples may differ from what is described with regard to FIG. 3. The number and arrangement of components shown in FIG. 3 are provided as an example. In practice, the DAB circuit 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the DAB circuit 300 may perform one or more functions described as being performed by another set of components of the DAB circuit 300. For example, the switching control algorithms described above for the low-voltage output mode and the high-voltage output mode may be extended to DAB circuits with four or more phases. FIG. 4 illustrates a schematic block diagram of a control circuit 400 according to one or more implementations. The control circuit 400 may be implemented as the control circuit 120 described in connection with FIGS. 1-3. The control circuit 400 may include a regulator circuit 402 and a PWM generator 404. The regulator circuit 402 may include at least one of a voltage regulator or a current regulator. In this example, the regulator circuit 402 includes both a voltage regulator 406 and a current regulator 408. The regulator circuit 402 may determine the control variable q based on at least one of the output voltage Vo or the output current Io of a dual active bridge converter. For example, the regulator circuit 402 may include a first error component 410 (e.g., an error generator or subtractor) that generates a first error signal 412 based on a difference between a voltage reference signal Voref and the output voltage Vo, and provides the first error signal 412 to the voltage regulator 406. The voltage regulator 406 may generate a current reference signal Ioref based on the first error signal 412. The regulator circuit 402 may include a second error component 414 (e.g., an error generator or subtractor) that generates a second error signal 416 based on a difference between the current reference signal Ioref and the output current Io, and provides the second error signal 416 to the current regulator 408. The current regulator 408 may generate the control variable φ based on the second error signal 416.

The regulator circuit 402 may include a processor 418 that receives one or more input variables, such as the input voltage Vin, the output voltage Vo, and the input current Iin, and determines a value for the scaling factor k based on the input variables. The processor 418 may include or may be coupled to a memory that stores a lookup table that includes a plurality of values for the scaling factor k. The processor 418 may determine, from the lookup table, the scaling factor k based on the input voltage Vin, the output voltage Vo, and the input current Iin. Thus, the scaling factor k may be variable and may be dynamically adjusted in real-time. A multiplier 420 may receive the value for the scaling factor k and determine a duty cycle D (e.g., D1=D2) as a product of the scaling factor k and the control variable q.

The PWM generator 404 may include a plurality of outputs coupled to a plurality of switches of a dual active bridge converter. The PWM generator 404 may receive the control variable φ, the first duty cycle D1, and the second duty cycle D2, generate a plurality of control signals based on the control variable φ, the first duty cycle D1, and the second duty cycle D2 for driving the plurality of switches of the dual active bridge converter, and output the plurality of control signals via the plurality of outputs.

As indicated above, FIG. 4 is provided as an example. Other examples may differ from what is described with regard to FIG. 4.

Figure 5:
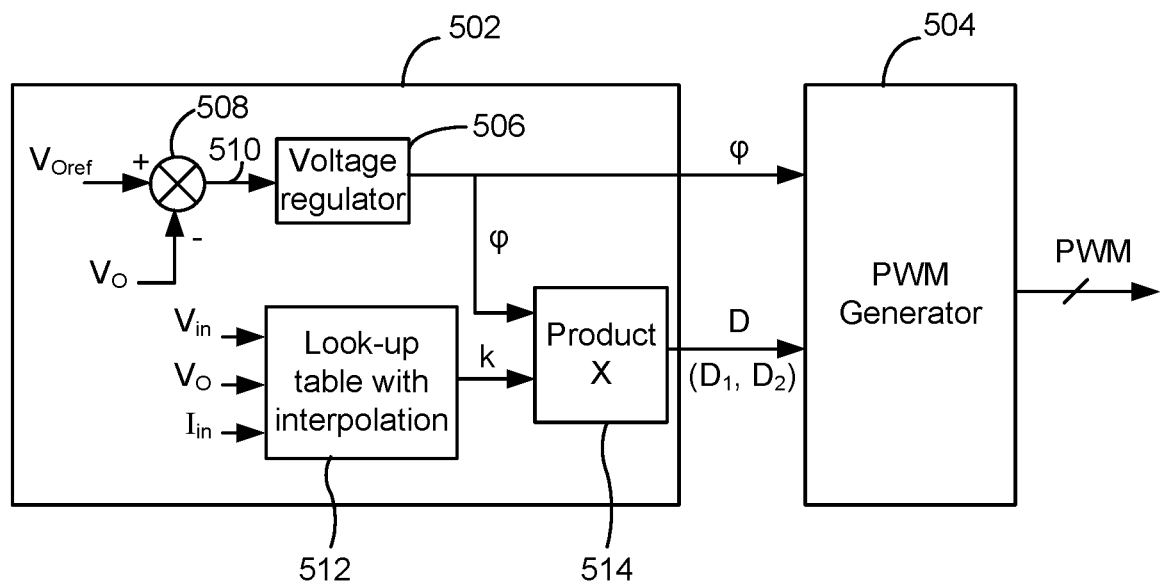
FIG. 5 illustrates a schematic block diagram of a control circuit according to one or more implementations.

FIG. 5 illustrates a schematic block diagram of a control circuit 500 according to one or more implementations. The control circuit 500 may be implemented as the control circuit 120 described in connection with FIGS. 1-3. The control circuit 500 may include a regulator circuit 502 and a PWM generator 504. The regulator circuit 502 may include at least one of a voltage regulator or a current regulator. In this example, the regulator circuit 502 includes a voltage regulator 506. The regulator circuit 502 may determine the control variable q based on the output voltage Vo of a dual active bridge converter. For example, the regulator circuit 502 may include an error component 508 (e.g., an error generator or subtractor) that generates an error signal 510 based on a difference between a voltage reference signal Voref and the output voltage Vo, and provides the error signal 510 to the voltage regulator 506. The voltage regulator 506 may generate the control variable φ based on the error signal 510.

The regulator circuit 502 may include a processor 512 that receives one or more input variables, such as the input voltage Vin, the output voltage Vo, and the output current Io, and determines a value for the scaling factor k based on the input variables. The processor 512 may include or may be coupled to a memory that stores a lookup table that includes a plurality of values for the scaling factor k. The processor 512 may determine, from the lookup table, the scaling factor k based on the input voltage Vin, the output voltage Vo, and the output current Io. Thus, the scaling factor k may be variable and may be dynamically adjusted in real-time. A multiplier 514 may receive the value for the scaling factor k and determine a duty cycle D (e.g., D1=D2) as a product of the scaling factor k and the control variable q.

The PWM generator 504 may include a plurality of outputs coupled to a plurality of switches of a dual active bridge converter. The PWM generator 504 may receive the control variable φ, the first duty cycle D1, and the second duty cycle D2, generate a plurality of control signals based on the control variable q, the first duty cycle D1, and the second duty cycle D2 for driving the plurality of switches of the dual active bridge converter, and output the plurality of control signals via the plurality of outputs.

As indicated above, FIG. 5 is provided as an example. Other examples may differ from what is described with regard to FIG. 5.

Figure 6:
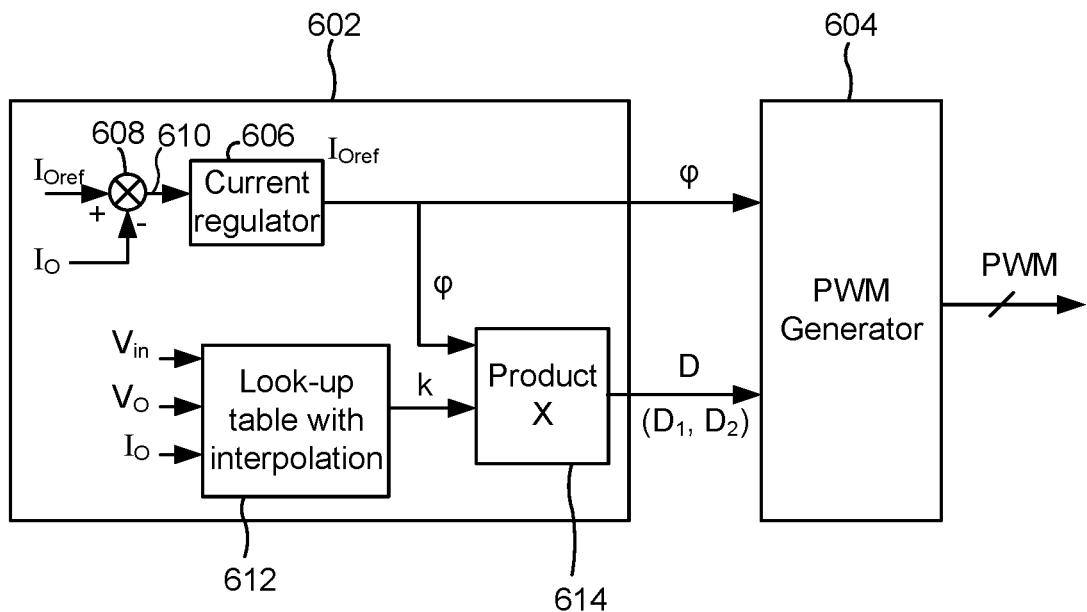
FIG. 6 illustrates a schematic block diagram of a control circuit according to one or more implementations.

FIG. 6 illustrates a schematic block diagram of a control circuit 600 according to one or more implementations. The control circuit 600 may be implemented as the control circuit 120 described in connection with FIGS. 1-3. The control circuit 600 may include a regulator circuit 602 and a PWM generator 604. The regulator circuit 602 may include at least one of a voltage regulator or a current regulator. In this example, the regulator circuit 602 includes a current regulator 606. The regulator circuit 602 may determine the control variable q based on the output current Io of a dual active bridge converter. For example, the regulator circuit 602 may include an error component 608 (e.g., an error generator or subtractor) that generates an error signal 610 based on a difference between a current reference signal Voref and the output current Io, and provides the error signal 610 to the current regulator 606. The current regulator 606 may generate the control variable φ based on the error signal 610.

The regulator circuit 602 may include a processor 612 that receives one or more input variables, such as the input voltage Vin, the output voltage Vo, and the output current Io, and determines a value for the scaling factor k based on the input variables. The processor 612 may include or may be coupled to a memory that stores a lookup table that includes a plurality of values for the scaling factor k. The processor 612 may determine, from the lookup table, the scaling factor k based on the input voltage Vin, the output voltage Vo, and the output current Io. Thus, the scaling factor k may be variable and may be dynamically adjusted in real-time. A multiplier 614 may receive the value for the scaling factor k and determine a duty cycle D (e.g., D1=D2) as a product of the scaling factor k and the control variable q.

The PWM generator 604 may include a plurality of outputs coupled to a plurality of switches of a dual active bridge converter. The PWM generator 604 may receive the control variable q, the first duty cycle D1, and the second duty cycle D2, generate a plurality of control signals based on the control variable q, the first duty cycle D1, and the second duty cycle D2 for driving the plurality of switches of the dual active bridge converter, and output the plurality of control signals via the plurality of outputs.

As indicated above, FIG. 6 is provided as an example. Other examples may differ from what is described with regard to FIG. 6.

Figure 7:
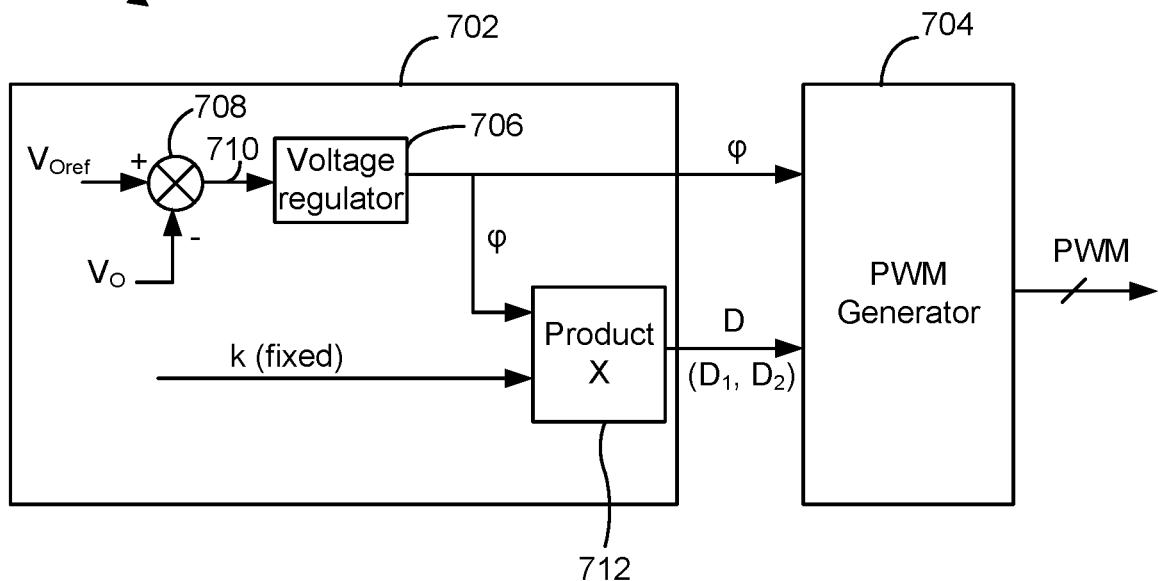
FIG. 7 illustrates a schematic block diagram of a control circuit according to one or more implementations.

FIG. 7 illustrates a schematic block diagram of a control circuit 700 according to one or more implementations. The control circuit 700 may be implemented as the control circuit 120 described in connection with FIGS. 1-3. The control circuit 700 may include a regulator circuit 702 and a PWM generator 704. The regulator circuit 702 may include at least one of a voltage regulator or a current regulator. In this example, the regulator circuit 702 includes a voltage regulator 706. The regulator circuit 702 may determine the control variable q based on the output voltage Vo of a dual active bridge converter. For example, the regulator circuit 702 may include an error component 708 (e.g., an error generator or subtractor) that generates an error signal 710 based on a difference between a voltage reference signal Voref and the output voltage Vo, and provides the error signal 710 to the voltage regulator 706. The voltage regulator 706 may generate the control variable φ based on the error signal 710.

The regulator circuit 702 may be configured with a fixed value for the scaling factor k. A multiplier 712 may receive the fixed value for the scaling factor k and determine a duty cycle D (e.g., D1=D2) as a product of the scaling factor k and the control variable q.

The PWM generator 704 may include a plurality of outputs coupled to a plurality of switches of a dual active bridge converter. The PWM generator 704 may receive the control variable q, the first duty cycle D1, and the second duty cycle D2, generate a plurality of control signals based on the control variable q, the first duty cycle D1, and the second duty cycle D2 for driving the plurality of switches of the dual active bridge converter, and output the plurality of control signals via the plurality of outputs.

As indicated above, FIG. 7 is provided as an example. Other examples may differ from what is described with regard to FIG. 7.

Figure 8:
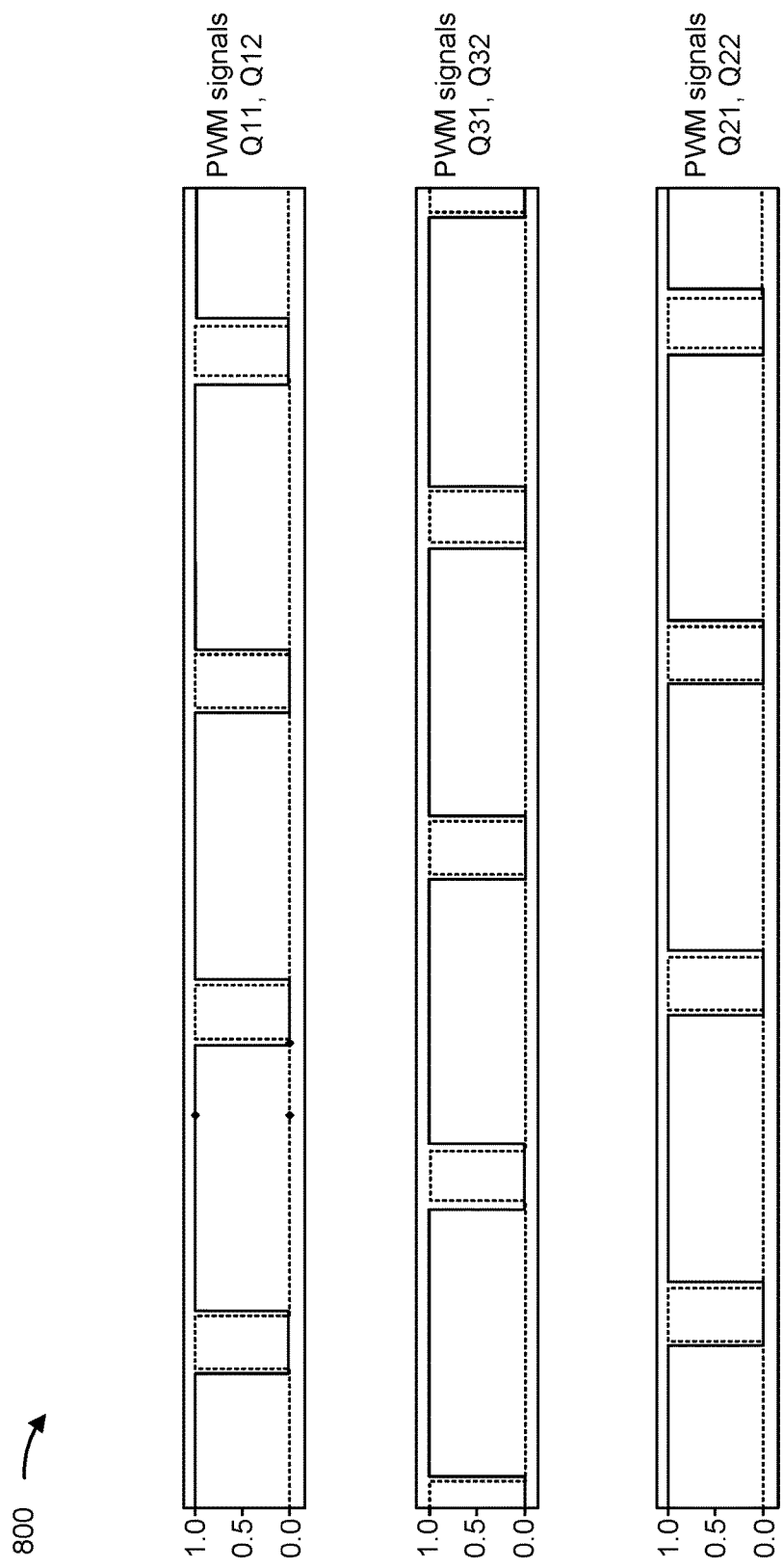
FIG. 8 is a diagram of a plurality of drive signals for controlling switching states within a DAB circuit.

FIG. 8 is a diagram 800 of a plurality of drive signals for controlling switching states within a DAB circuit. The DAB circuit being controlled may be a full-bridge DAB circuit similar to the DAB circuit 200 described in connection with FIG. 2. The plurality of drive signals may be PWM signals derived from the control signals S1, S2, S3, and S4 in accordance with a complementary PWM switching algorithm with outer phase shifts. In particular, the plurality of drive signals includes drive signals for driving the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42. The plurality of drive signals are square waves that switch between two voltage levels or states (e.g., a low voltage level and a high voltage level). A transistor may be regarded as being on when a respective drive signal is in a high state and may be regarded as being off when the respective drive signal is in a low state.

The first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 are each driven as described above in connection with FIG. 2. The drive signals for driving the fourth high-side transistor Q41, and the fourth low-side transistor Q42 are not shown, but may be shifted 180° from the drive signals for driving the second high-side transistor Q21, and the second low-side transistor Q22. The duty cycles are determined based on multiplying the control variable q with the scaling factor k.

As indicated above, FIG. 8 is provided as an example. Other examples may differ from what is described with regard to FIG. 8.

The following provides an overview of some Aspects of the present disclosure:

Aspect 1: A dual active bridge circuit, comprising: a primary side circuit configured to be coupled to a power source for receiving an input voltage and an input current, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage and an output current, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current; and a control circuit configured to drive each of the first high-side transistor, the first low-side transistor, the second high-side transistor, and the second low-side transistor between respective switching states to control the voltage differential across the energy transfer inductor, wherein the control circuit is configured to drive the first high-side transistor and the first low-side transistor in a complementary manner based on a first duty cycle, wherein the control circuit is configured to drive the second high-side transistor and the second low-side transistor in a complementary manner based on a second duty cycle, wherein the control circuit is configured to drive the first high-side transistor and the second high-side transistor with a same duty cycle, wherein the control circuit is configured to drive the second high-side transistor with a phase shift relative to the first high-side transistor, and wherein the control circuit is configured to determine a control variable based on at least one of the output voltage or the output current, multiply the control variable by a scaling factor to determine the first duty cycle and the second duty cycle, and generate a plurality of control signals based on the control variable, the first duty cycle, and the second duty cycle for driving the first high-side transistor, the first low-side transistor, the second high-side transistor, and the second low-side transistor between the respective switching states.

Aspect 2: The dual active bridge circuit of Aspect 1, wherein the control variable is a target phase shift between the first half-bridge and the second half-bridge.

Aspect 3: The dual active bridge circuit of any of Aspects 1-2, wherein the control circuit includes a pulse-width modulation (PWM) generator configured to receive the control variable, the first duty cycle, and the second duty cycle, and generate the plurality of control signals based on the control variable, the first duty cycle, and the second duty cycle.

Aspect 4: The dual active bridge circuit of any of Aspects 1-3, wherein the control circuit includes a regulator circuit comprising at least one of a voltage regulator or a current regulator, wherein the regulator circuit is configured to determine the control variable based on at least one of the output voltage or the output current.

Aspect 5: The dual active bridge circuit of any of Aspects 1-4, wherein the control circuit is configured to drive the first high-side transistor with the first duty cycle, and drive the second high-side transistor with the second duty cycle.

Aspect 6: The dual active bridge circuit of any of Aspects 1-5, wherein the scaling factor is fixed for an entire output voltage range of the dual active bridge circuit.

Aspect 7: The dual active bridge circuit of any of Aspects 1-6, wherein the scaling factor is variable, wherein the dual active bridge circuit further comprises: a memory configured to store a lookup table that includes a plurality of values for the scaling factor, and wherein the control circuit is configured to determine the output voltage, the output current, or an output power of the dual active bridge circuit, and determine, from the lookup table, the scaling factor based on the output voltage, the output current, or the output power.

Aspect 8: The dual active bridge circuit of Aspect 7, wherein the control circuit is configured to determine the input voltage, the output voltage, and the input current of the dual active bridge circuit, and determine, from the lookup table, the scaling factor based on the input voltage, the output voltage, and the input current.

Aspect 9: The dual active bridge circuit of Aspect 7, wherein the control circuit is configured to determine the input voltage, the output voltage, and the output current of the dual active bridge circuit, and determine, from the lookup table, the scaling factor based on the input voltage, the output voltage, and the output current.

Aspect 10: The dual active bridge circuit of Aspect 7, wherein the control circuit is configured to vary the scaling factor based on the output voltage and a load of the dual active bridge circuit.

Aspect 11: The dual active bridge circuit of Aspect 10, wherein the control circuit is configured to determine a value for the scaling factor based on the plurality of values such that power losses of the first high-side transistor, the first low-side transistor, the second high-side transistor, and the second low-side transistor are minimized for the output voltage and the load.

Aspect 12: The dual active bridge circuit of Aspect 10, wherein the control circuit is configured to determine a value for the scaling factor based on the plurality of values such that the voltage differential across the energy transfer inductor is driven to zero during a turn on the first high-side transistor or during a turn on the first low-side transistor.

Aspect 13: The dual active bridge circuit of Aspect 7, wherein the transformer has a transformer turn ratio, wherein, based on the input voltage being not equal to a product of the output voltage and the transformer turn ratio, the control circuit is configured to determine a value for the scaling factor within a first range of values, wherein, based on the input voltage being equal to the product of the output voltage and the transformer turn ratio, the control circuit is configured to determine a value for the scaling factor, within a second range of values, and wherein the first range of values extend from a minimum value to an intermediate value that is greater than the minimum value, and the second range of values extend from the intermediate value to a maximum value that is greater than the intermediate value.

Aspect 14: The dual active bridge circuit of any of Aspects 1-13, wherein the control circuit is configured to determine a product of the control variable and the scaling factor, and add an offset value to the product to determine the first duty cycle and the second duty cycle.

Aspect 15: The dual active bridge circuit of any of Aspects 1-14, wherein the scaling factor is a first scaling factor, wherein the control circuit is configured to multiply the control variable by the first scaling factor to determine the first duty cycle and the second duty cycle, wherein the control circuit is configured to multiply the control variable by a second scaling factor to determine a target phase shift between the first half-bridge and the second half-bridge, and wherein the control circuit is configured to generate the plurality of control signals based on the target phase shift, the first duty cycle, and the second duty cycle for driving the first high-side transistor, the first low-side transistor, the second high-side transistor, and the second low-side transistor between the respective switching states.

Aspect 16: A system for controlling a dual active bridge converter, comprising: a regulator circuit comprising at least one of a voltage regulator or a current regulator, wherein the regulator circuit is configured to determine a control variable based on at least one of an output voltage or an output current of the dual active bridge converter; and a pulse-width modulation (PWM) generator comprising a plurality of outputs coupled to a plurality of switches of the dual active bridge converter, wherein the PWM generator is configured to drive a first high-side switch and a first low-side switch of a first half-bridge of the dual active bridge converter in a complementary manner based on a first duty cycle, wherein the PWM generator is configured to drive a second high-side switch and a second low-side switch a second half-bridge of the dual active bridge converter in a complementary manner based on a second duty cycle, wherein the PWM generator is configured to drive the first high-side switch and the second high-side switch with a same duty cycle, wherein the PWM generator is configured to drive the second high-side switch with a phase shift relative to the first high-side switch, wherein the regulator circuit is configured to multiply the control variable by a scaling factor to determine the first duty cycle and the second duty cycle, and wherein the PWM generator is configured to receive the control variable, the first duty cycle, and the second duty cycle, generate a plurality of control signals based on the control variable, the first duty cycle, and the second duty cycle for driving the plurality of switches of the dual active bridge converter, and output the plurality of control signals via the plurality of outputs.

Aspect 17: The system of Aspect 16, wherein the first duty cycle is a duty cycle for the first high-side switch, and the second duty cycle is a duty cycle for the second high-side switch.

Aspect 18: The system of any of Aspects 16-17, wherein the scaling factor is fixed for an entire output voltage range of the dual active bridge converter.

Aspect 19: The system of any of Aspects 16-18, further comprising: a memory configured to store a lookup table that includes a plurality of values for the scaling factor, wherein the scaling factor is variable based on the plurality of values, and wherein the regulator circuit is configured to determine the output voltage, the output current, or an output power of the dual active bridge converter, and determine, from the lookup table, the scaling factor based on the output voltage, the output current, or the output power.

Aspect 20: A method for controlling a dual active bridge converter, comprising: detecting at least one of an output voltage or an output current of the dual active bridge converter; determining a control variable based on at least one of an output voltage or an output current of the dual active bridge converter and based on one or more reference values; driving a first high-side switch and a first low-side switch of a first half-bridge of the dual active bridge converter in a complementary manner based on a first duty cycle; driving a second high-side switch and a second low-side switch a second half-bridge of the dual active bridge converter in a complementary manner based on a second duty cycle, wherein the first high-side switch and the second high-side switch are driven with a same duty cycle, and wherein the second high-side switch is driven with a phase shift relative to the first high-side switch; determining the first duty cycle and the second duty cycle by multiplying the control variable by a scaling factor; and generating a plurality of control signals based on the control variable, the first duty cycle, and the second duty cycle for driving a plurality of switches of the dual active bridge converter, wherein the plurality of switches include the first high-side switch, the first low-side switch, the second high-side switch, and the second low-side switch.

Aspect 21: The method of Aspect 20, wherein a duty cycle applied to the first low-side switch and the second low-side switch is inversely related a duty cycle applied to the first high-side switch and the second high-side switch.

Aspect 22: A system configured to perform one or more operations recited in one or more of Aspects 1-21.

Aspect 23: An apparatus comprising means for performing one or more operations recited in one or more of Aspects 1-21.

Aspect 24: A non-transitory computer-readable medium storing a set of instructions, the set of instructions comprising one or more instructions that, when executed by a device, cause the device to perform one or more operations recited in one or more of Aspects 1-21.

Aspect 25: A computer program product comprising instructions or code for executing one or more operations recited in one or more of Aspects 1-21.

The foregoing disclosure provides illustration and description, but is not intended to be exhaustive or to limit the implementations to the precise form disclosed. Modifications and variations may be made in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A dual active bridge circuit, comprising:
   a primary side circuit configured to be coupled to a power source for receiving an input voltage and an input current, wherein the primary side circuit comprises:
      a first half-bridge comprising a first high-side transistor and a first low-side transistor electrically coupled at a first node; and
      an energy transfer inductor coupled to the first node and configured to provide an inductor current based on a voltage differential across the energy transfer inductor;
   a secondary side circuit configured to provide an output voltage and an output current, wherein the secondary side circuit comprises:
      a second half-bridge comprising a second high-side transistor and a second low-side transistor electrically coupled at a second node;
   a transformer configured to transfer energy from the primary side circuit to the secondary side circuit based on the inductor current; and
   a control circuit configured to drive each of the first high-side transistor, the first low-side transistor, the second high-side transistor, and the second low-side transistor between respective switching states to control the voltage differential across the energy transfer inductor,
   wherein the control circuit is configured to drive the first high-side transistor and the first low-side transistor in a complementary manner based on a first duty cycle,
   wherein the control circuit is configured to drive the second high-side transistor and the second low-side transistor in a complementary manner based on a second duty cycle,
   wherein the control circuit is configured to drive the first high-side transistor and the second high-side transistor with a same duty cycle,
   wherein the control circuit is configured to drive the second high-side transistor with a phase shift relative to the first high-side transistor,
   wherein the control circuit is configured to determine a control variable based on at least one of the output voltage or the output current, multiply the control variable by a scaling factor to determine the first duty cycle and the second duty cycle, and generate a plurality of control signals based on the control variable, the first duty cycle, and the second duty cycle for driving the first high-side transistor, the first low-side transistor, the second high-side transistor, and the second low-side transistor between the respective switching states,
   wherein the control variable is a target phase shift between the first half-bridge and the second half-bridge,
   wherein the control circuit includes a pulse-width modulation (PWM) generator configured to receive the control variable, the first duty cycle, and the second duty cycle, and generate the plurality of control signals based on the control variable, the first duty cycle, and the second duty cycle, and
   wherein the control circuit includes a regulator circuit comprising at least one of a voltage regulator or a current regulator, wherein the regulator circuit is configured to determine the control variable based on at least one of the output voltage or the output current.

2. The dual active bridge circuit of claim 1, wherein the control circuit is configured to drive the first high-side transistor with the first duty cycle, and drive the second high-side transistor with the second duty cycle.

3. The dual active bridge circuit of claim 1, wherein the scaling factor is fixed for an entire output voltage range of the dual active bridge circuit.

4. The dual active bridge circuit of claim 1, wherein the scaling factor is variable,
   wherein the dual active bridge circuit further comprises:
      a memory configured to store a lookup table that includes a plurality of values for the scaling factor, and
      wherein the control circuit is configured to determine the output voltage, the output current, or an output power of the dual active bridge circuit, and determine, from the lookup table, the scaling factor based on the output voltage, the output current, or the output power.

5. The dual active bridge circuit of claim 4, wherein the control circuit is configured to determine the input voltage, the output voltage, and the input current of the dual active bridge circuit, and determine, from the lookup table, the scaling factor based on the input voltage, the output voltage, and the input current.

6. The dual active bridge circuit of claim 4, wherein the control circuit is configured to determine the input voltage, the output voltage, and the output current of the dual active bridge circuit, and determine, from the lookup table, the scaling factor based on the input voltage, the output voltage, and the output current.

7. The dual active bridge circuit of claim 4, wherein the control circuit is configured to vary the scaling factor based on the output voltage and a load of the dual active bridge circuit.

8. The dual active bridge circuit of claim 7, wherein the control circuit is configured to determine a value for the scaling factor based on the plurality of values such that power losses of the first high-side transistor, the first low-side transistor, the second high-side transistor, and the second low-side transistor are minimized for the output voltage and the load.

9. The dual active bridge circuit of claim 7, wherein the control circuit is configured to determine a value for the scaling factor based on the plurality of values such that the voltage differential across the energy transfer inductor is driven to zero during a turn on of the first high-side transistor or during a turn on of the first low-side transistor.

10. The dual active bridge circuit of claim 4, wherein the transformer has a transformer turn ratio,
   wherein, based on the input voltage being not equal to a product of the output voltage and the transformer turn ratio, the control circuit is configured to determine a value for the scaling factor within a first range of values,
   wherein, based on the input voltage being equal to the product of the output voltage and the transformer turn ratio, the control circuit is configured to determine a value for the scaling factor within a second range of values, and
   wherein the first range of values extend from a minimum value to an intermediate value that is greater than the minimum value, and the second range of values extend from the intermediate value to a maximum value that is greater than the intermediate value.

11. The dual active bridge circuit of claim 1, wherein the control circuit is configured to determine a product of the control variable and the scaling factor, and add an offset value to the product to determine the first duty cycle and the second duty cycle.

12. The dual active bridge circuit of claim 1, wherein the scaling factor is a first scaling factor,
   wherein the control circuit is configured to multiply the control variable by the first scaling factor to determine the first duty cycle and the second duty cycle,
   wherein the control circuit is configured to multiply the control variable by a second scaling factor to determine the target phase shift between the first half-bridge and the second half-bridge, and
   wherein the control circuit is configured to generate the plurality of control signals based on the target phase shift, the first duty cycle, and the second duty cycle for driving the first high-side transistor, the first low-side transistor, the second high-side transistor, and the second low-side transistor between the respective switching states.

13. A system for controlling a dual active bridge converter, comprising:

a regulator circuit comprising at least one of a voltage regulator or a current regulator, wherein the regulator circuit is configured to determine a control variable based on at least one of an output voltage or an output current of the dual active bridge converter; and
a pulse-width modulation (PWM) generator comprising a plurality of outputs coupled to a plurality of switches of the dual active bridge converter,
   wherein the PWM generator is configured to drive a first high-side switch and a first low-side switch of a first half-bridge of the dual active bridge converter in a complementary manner based on a first duty cycle,
   wherein the PWM generator is configured to drive a second high-side switch and a second low-side switch of a second half-bridge of the dual active bridge converter in a complementary manner based on a second duty cycle,
   wherein the PWM generator is configured to drive the first high-side switch and the second high-side switch with a same duty cycle,
   wherein the PWM generator is configured to drive the second high-side switch with a phase shift relative to the first high-side switch,
   wherein the regulator circuit is configured to multiply the control variable by a first scaling factor to determine the first duty cycle and the second duty cycle,
   wherein the PWM generator is configured to receive the control variable, the first duty cycle, and the second duty cycle, generate a plurality of control signals based on the control variable, the first duty cycle, and the second duty cycle for driving the plurality of switches of the dual active bridge converter, and output the plurality of control signals via the plurality of outputs,
   wherein the plurality of switches include the first high-side switch, the first low-side switch, the second high-side switch, and the second low-side switch,
   wherein the regulator circuit is configured to multiply the control variable by a second scaling factor to determine a target phase shift between the first half-bridge and the second half-bridge, and
   wherein the regulator circuit is configured to generate the plurality of control signals based on the target phase shift, the first duty cycle, and the second duty cycle for driving the first high-side switch, the first low-side switch, the second high-side switch, and the second low-side switch between respective switching states.

14. The system of claim 13, wherein the first duty cycle is a duty cycle for the first high-side switch, and the second duty cycle is a duty cycle for the second high-side switch.

15. The system of claim 13, wherein the first scaling factor is fixed for an entire output voltage range of the dual active bridge converter.

16. The system of claim 13, further comprising:
a memory configured to store a lookup table that includes a plurality of values for the first scaling factor,
wherein the first scaling factor is variable based on the plurality of values, and
wherein the regulator circuit is configured to determine the output voltage, the output current, or an output power of the dual active bridge converter, and determine, from the lookup table, the first scaling factor based on the output voltage, the output current, or the output power.

17. A method for controlling a dual active bridge converter, comprising:
- detecting at least one of an output voltage or an output current of the dual active bridge converter;
- determining, by a regulator circuit comprising at least one of a voltage regulator or a current regulator, a control variable based on at least one of the output voltage or the output current of the dual active bridge converter and based on one or more reference values;
- driving a first high-side switch and a first low-side switch of a first half-bridge of the dual active bridge converter in a complementary manner based on a first duty cycle;
- driving a second high-side switch and a second low-side switch of a second half-bridge of the dual active bridge converter in a complementary manner based on a second duty cycle,
  - wherein the control variable is a target phase shift between the first half-bridge and the second half-bridge,
  - wherein the first high-side switch and the second high-side switch are driven with a same duty cycle, and
  - wherein the second high-side switch is driven with a phase shift relative to the first high-side switch;
- determining the first duty cycle and the second duty cycle by multiplying the control variable by a scaling factor; and
- generating, by a pulse-width modulation (PWM) generator, a plurality of control signals based on the control variable, the first duty cycle, and the second duty cycle for driving a plurality of switches of the dual active bridge converter, wherein the plurality of switches include the first high-side switch, the first low-side switch, the second high-side switch, and the second low-side switch.

18. The method of claim 17, wherein a duty cycle applied to the first low-side switch and the second low-side switch is inversely related a duty cycle applied to the first high-side switch and the second high-side switch.

* * * * *